April 27, 1971          I. A. HINT          3,576,655
PARTICULATE MATERIAL AND SHAPED ARTICLE MADE THEREFROM
Original Filed Jan. 24, 1964          7 Sheets-Sheet 1
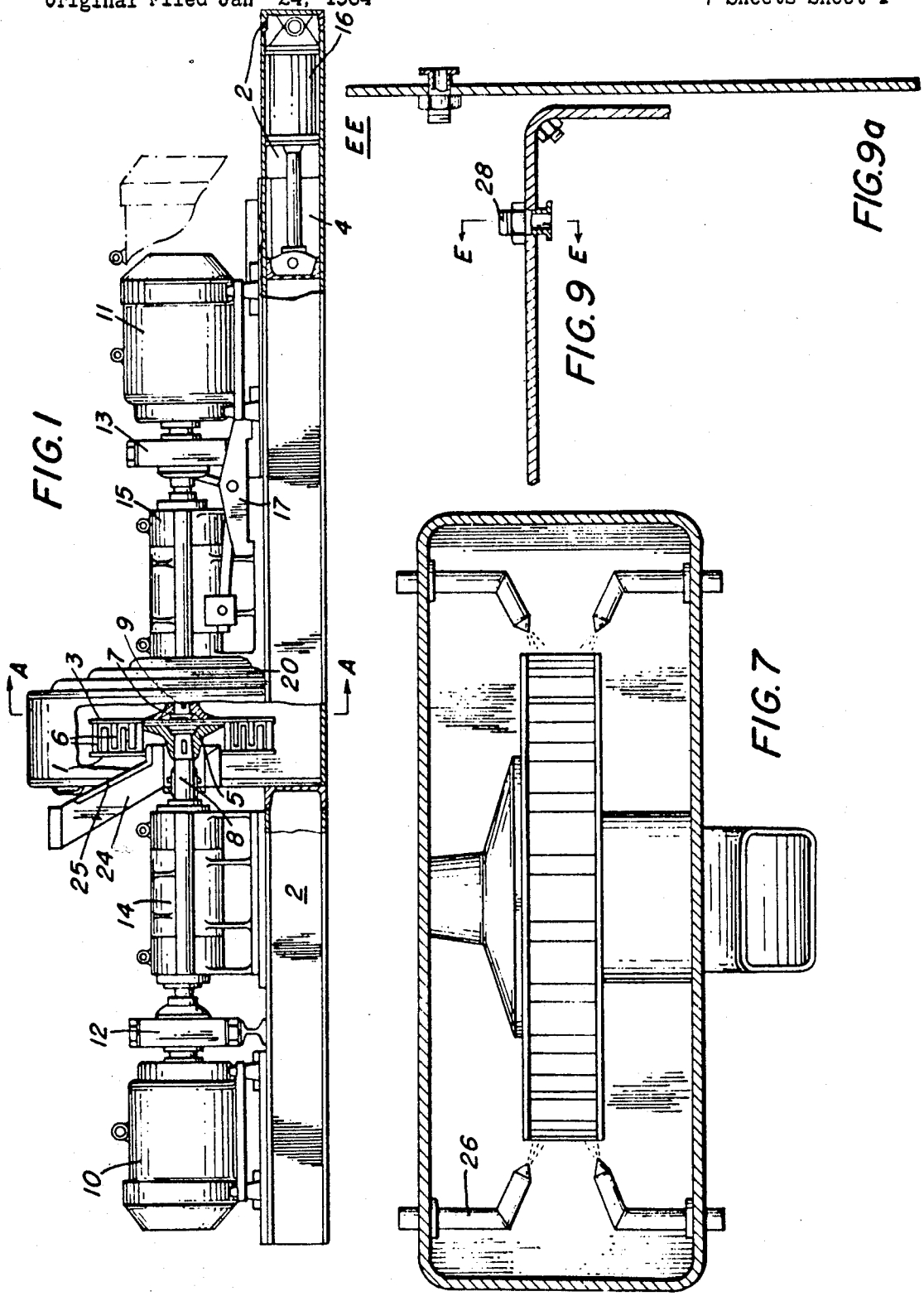

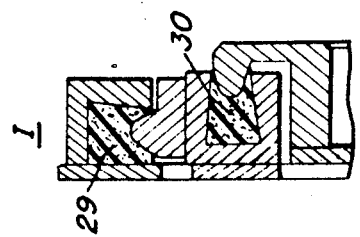
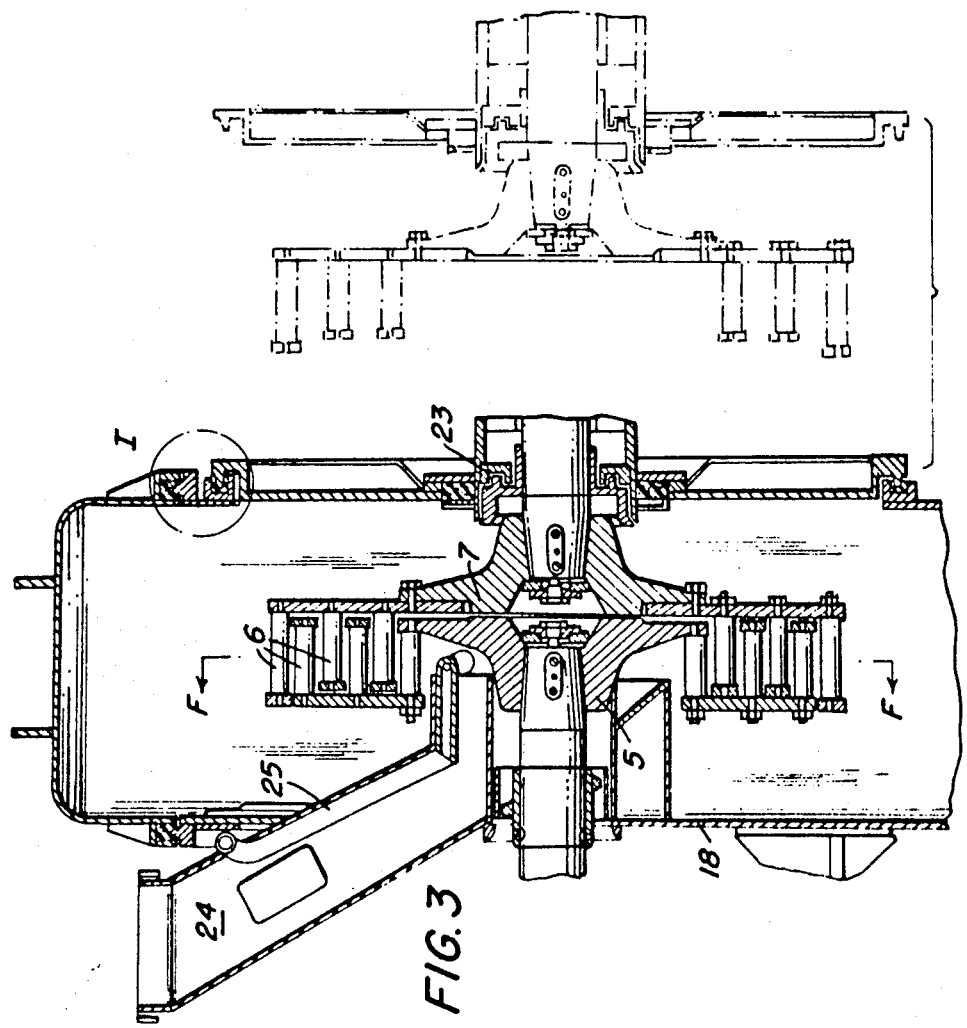

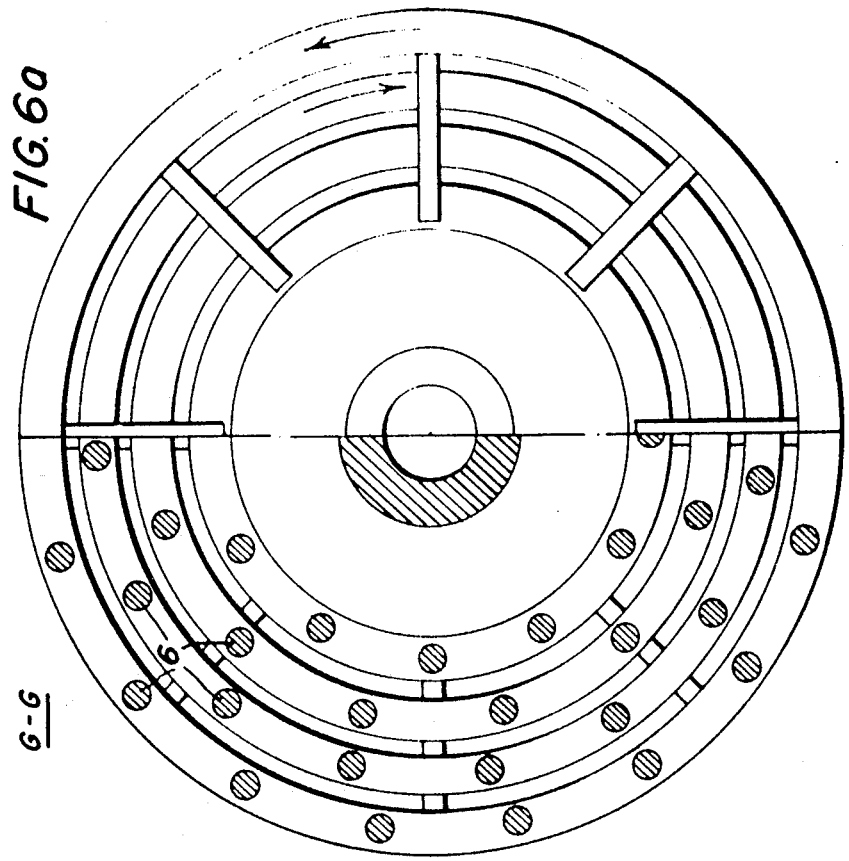
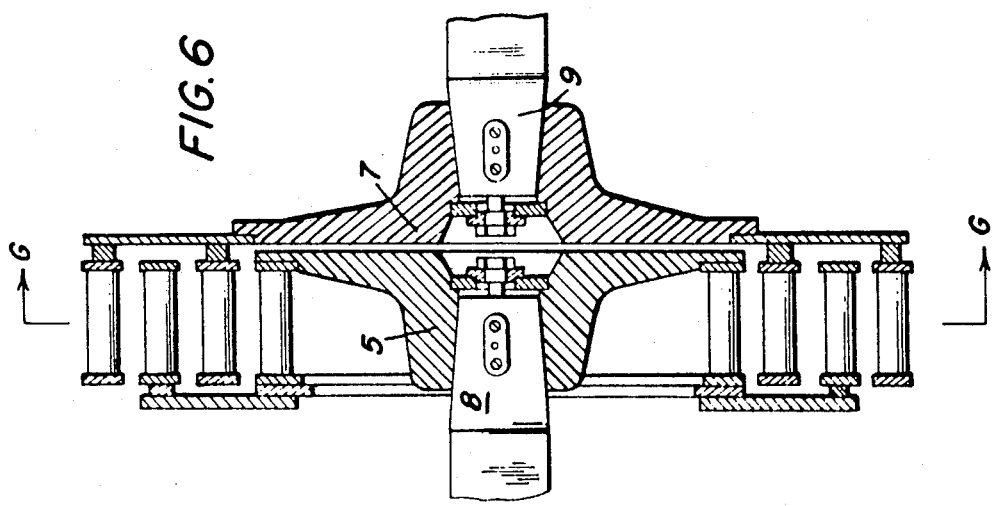

April 27, 1971    I. A. HINT    3,576,655
PARTICULATE MATERIAL AND SHAPED ARTICLE MADE THEREFROM
Original Filed Jan. 24, 1964    7 Sheets-Sheet 7
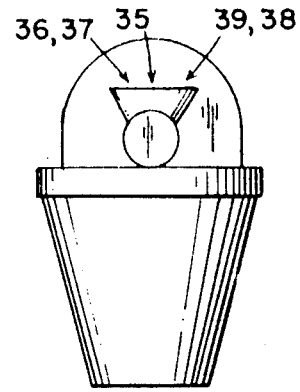
FIG. 11
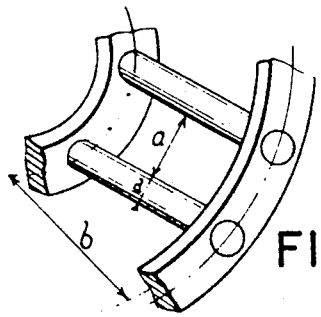
FIG. 13
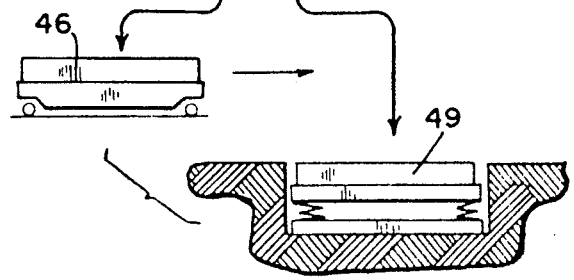
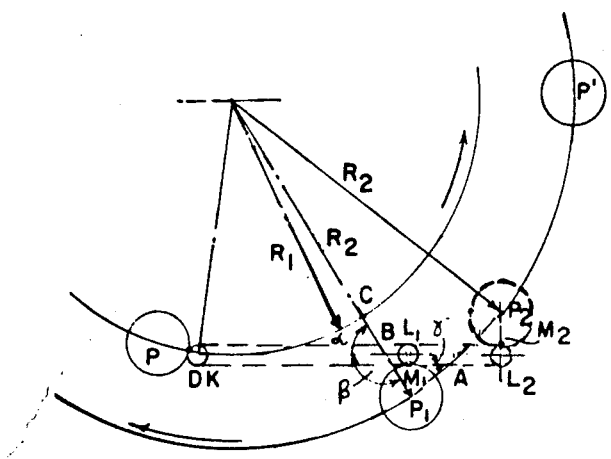
FIG. 12 the United States Patent Office
3,576,655
Patented Apr. 27, 1971

3,576,655
PARTICULATE MATERIAL AND SHAPED
ARTICLE MADE THEREFROM
Iohannes Alexandrovich Hint, Viimsi tee 7,
Tallin Merivalja, U.S.S.R.
Application Jan. 24, 1964, Ser. No. 339,912, now Patent
No. 3,331,905, dated July 18, 1967, which is a continuation-in-part of application Ser. No. 37,022, June 20, 1960. Divided and this application May 31, 1967, Ser. No. 642,452
Int. Cl. C04b 21/00
U.S. Cl. 106—87
8 Claims

ABSTRACT OF THE DISCLOSURE

A modular constructional unit made from an autoclave mixture of 65 to 86 percent by weight of dry mixture sand, 14 to 35 percent by weight of dry mixture lime, and 8 to 43 percent of the dry mixture of water, the so manufactured modular constructional unit having a compressive strength of from 200 to 3250 kg./cm.$^2$. The density of the modular constructional unit is from about 0.9 to 2.0 kg./dm.$^2$. A foaming agent of either aluminum powder or a mixture of 60 percent carpenter's glue and 40 percent colophony soap may be added.

This application is a divisional of my prior filed application Ser. No. 339,912 filed Jan. 24, 1964, now Patent No. 3,331,905 and which application in turn was a continuation-in-part of my prior filed application Ser. No. 37,022 filed June 20, 1960, now abandoned.

This invention relates to the treatment of particulate materials and the shaped article made therefrom.

The invention further relates to the art of comminution and to certain improvements in connection with the product of processing or treating particulate materials by reducing the particle size so as to improve certain properties thereof per se or when simultaneously processed and mixed, blended or combined with other materials to improve the resultant mixes, blend or combination.

Still more particularly, the invention relates to comminution of materials that are non-homogeneous, that is, have crystalline parts and amorphous parts in a single particle such as sand grains and certain ores such as taconite, i.e. low grade iron ores. In this regard such particles are split along the line of weakness.

Further, the invention relates to particulate materials which have been comminuted by impact in an impact zone with particular reference to an arrangement in which the time interval between two successive impacts on any one particle is not longer than 0.05 second accompanied by an impact velocity of at least 15 meters per second.

Still, more particularly, this invention relates to a method for preparing fine grain materials for use in casting, building or making of structural or modular elements, such as blocks, bricks, panels, highway paving slabs, building components for hydrotechnical structures, columns and beams for use in industrial buildings and so forth. Besides, it makes possible the production of small-size building elements such as tiles, pipes, bricks, floor and roof slabs etc. Furthermore the manufacture, by granulation of iron ores or other ores, of mixes for briquetting. In addition, the improved comminuted particulate material can be used in the manufacture of different kinds of glass; and, can be cement and clinker for obtaining cements of improved quality; and can be different pulverous materials e.g. stabilizers for paints, varnishes and glues. The comminuted particulate material may even be corn flour.

Up to now in the making of building or structural elements such as blocks or bricks, it has been customary to utilize an aggregate of the desired size and to thoroughly mix such aggregate with a binding agent and to thereafter cast the element or article in a well-known manner. While this method is suitable for certain types of building or structural elements, the compression strength and the other physical properties of such elements are limited by the properties of the materials employed and consequently, a material increase in the compressive strength and in the other physical properties of such building or structural elements represents a material step forward in the art.

Additionally, until the advent of the process and apparatus inventions respectively set forth in my Pat. No. 3,331,905 and Ser. No. 434,733, highly activated and homogenized mixes could not be prepared by simultaneously treating all the raw components. It will be appreciated that excellent activating homogenization of mixes is essential in preparing high-quality building materials, such as, for instance, lime-sand blocks, bricks, as well as for obtaining briquettes of adequate strength for enhancing the properties of glass and cement; for more effective comminution of clinker; to manufacture high-quality additives for paint, varnishes and glues (using silicalcite i.e. silica-lime mixes, and other materials), and in corn grinding, to enhance yield and properties of flour. The prior art equipment, namely, ball mills, hammer mills, vibrating means and other blending devices do not suffice.

It is accordingly an object of the invention to provide a fine grain material for use in casting building or structural elements which will provide a structural element having a substantially greater compressive strength and other properties than those possible so far with the same materials.

A further object of the invention is the provision of a fine grain material for use in casting building or structural elements which may be conveniently produced and which is conducive to a high production rate.

A still further object of the invention is the provision of a fine grain material for use in casting building or structural elements with the resulting elements having a substantially greater compressive strength than was possible heretofore and in which the quantity of binding agent, such as lime, may be substantially reduced as compared to conventional amounts.

A still further object of the invention is the provision of a fine grain material for use in the preparation of briquettes, in the production of glass and cement and in the production of additives for paint varnishes and glues, all the products being of better properties than was possible so far for the same materials.

Further objects and advantages of the invention will be apparent from the following description taken together with the drawings in which reference numerals refer to like parts throughout:

FIG. 1 shows a disintegrator, front elevation partially cut away;

FIG. 3 shows a disintegrator and rotor assembly, enlarged sectional view;

FIG. 3a shows an enlarged fragmentary sectional view illustrating a portion of the structure shown in FIG. 3;

FIGS. 6 and 6a show disintegrator rotors having bars of cylindrical cross-section, FIG. 6 being a vertical cross-sectional view, FIG. 6a on the left hand side being a cross-sectional view taken along line G—G of FIG. 6 and the right-hand side of FIG. 6a being an end elevation of the structure of FIG. 6 as viewed from the left;

FIG. 7 shows a disintegrator, diagrammatical plan view;

FIG. 9 is a partially-cut-away view along line C—C shown on FIG. 2;

FIG. 9a is a sectional view taken along line E—E of FIG. 9;

FIG. 11 is a diagrammatic view of continuous manufacture of mix;

FIG. 12 is a diagrammatic representation displaying motion of grains between two adjacent rows of bars; and FIG. 13 shows the layout of disintegrator rotor bars of a joint bar circle.

Figure 5:
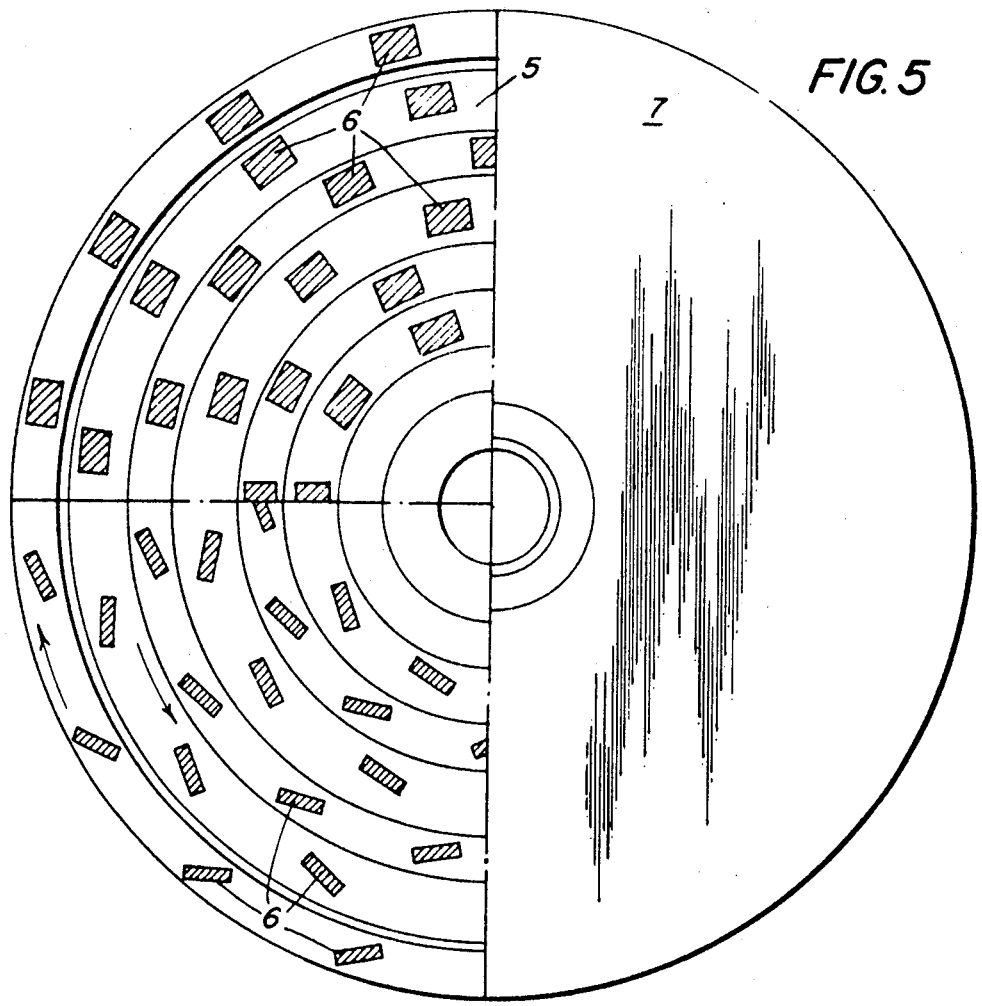
FIG. 5 is a cross-sectional view along line F—F shown on FIG. 3 having rotor bars of rectangular and plate-shape cross-section.
Figure 2:
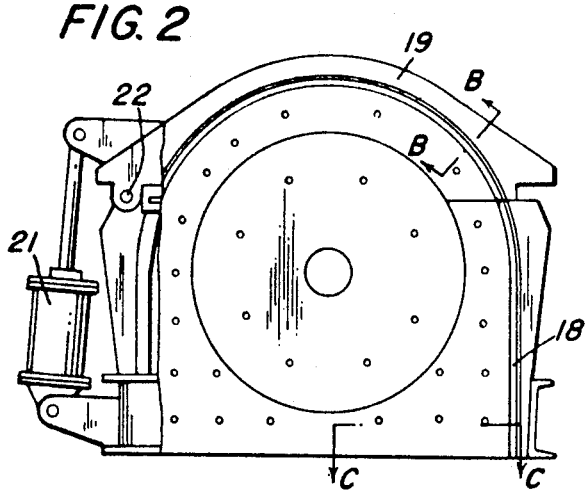
FIG. 2 shows a disintegrator, cross sectional view along line A—A as shown on FIG. 1.
Figure 8:
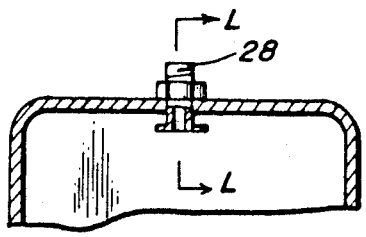
FIG. 8 is a partially-cut-away view along line B—B shown on FIG. 2.

One aspect of this invention involves the preparation of fine grain materials which may be utilized for casting building or structural elements, such as blocks, bricks, wall and floor sections and other modular construction unit and in which such elements will have a density of 1.8 kg./dm.$^3$ and a compressive strength exceeding 2000 kg./cm.$^2$, which corresponds to 28451.61 pounds per sq. inch which is materially greater than the compressive strength heretofore provided in building elements of this nature. It has been found that such improved results may be obtained by subjecting the particles of the fine grain materials utilized in the building elements to an activation by a succession of impacts of a certain velocity and within a certain time interval and as a result of such treatment, the material acquires new and previously unknown vastly improved properties.

In carrying out this invention, the materials utilized are supplied in the desired proportion, in particle size not exceeding two inches in the major dimension and are subjected to successive impacts in the impact zone of the present invention and the process is controlled so that the time interval between two impacts on any one particle is not longer than 0.05 sec. and the impact velocity on each particle is at least 15 m./sec. Furthermore, it has been found that the number of such impacts on each particle should be not less than three. It is pointed out that this invention may be carried out as a continuous process or may be utilized in connection with a batch process, but for economy of operation and where relatively large scale production is required, the continuous process is, of course, preferred.

It has also been found that in practicing this invention that a more thorough mixing of these materials occurs than was heretofore possible with conventional methods and this is particularly advantageous when mixing a binding agent, such as lime with the materials, since this more thorough mixing results in a complete coating of each particle of the aggregate by the binding agent necessary to provide a material having the improved qualities mentioned above. Furthermore, this invention may be carried out in a moist atmosphere or with a water addition which will result in providing a material which may be charged directly into a mold, thereby eliminating the necessity for an intermediate mixing step or operation.

For example, this invention may be utilized in connection with a mixture of sand and lime to provide a material for forming high quality silica block articles which possess improved qualities and provide a compressive strength of substantially more than 2000 kg./cm.$^2$. The improved results obtained by this invention flow directly from the provision of rapid impact at an impact velocity of not less than 15 m./sec. on each particle of the material and with the time interval between any two successive impacts limited to not longer than 0.05 sec. and for best results, there should be at least three such impacts.

It should be noted that the application of this invention is not limited to the use of only some specific types of material, or materials of definite grain size, but is applicable with any kind of material the properties of which are enhanced in the process, it is preferable nevertheless that the grain not exceed 2 in. in major dimension.

Such processing of materials embraces grains of any size, the finest included, i.e. of the order .1 micron radius. Owing to this, loess, pozzolan and various kinds of ash are rendered more active, resulting in raw materials of adequate quality for use in building structures.

Such processing causes changes in the geometrical shape of the grains, simultaneously improving their physical and diffusion properties. The particles of different stones, basically composed of $Al_2O_3$ or $Fe_2O_3$ or the like, when processed according to this invention, are activated like particles basically consisting of $SiO_2$. Owing to the processing according to the manner described, fine iron ore yields a mix adaptable to molding into balls and briquettes, which can be used in smelting.

Before setting forth specific examples, it is appropriate to give detailed consideration to the apparatus arrangement utilized in accomplishing the method of the present invention. It will be noted that the disintegrator or comminutor includes rotors as impacting means which are enclosed in a casing, having rotating support means with perpendicularly positioned bars arranged along intermeshed concentric circles to define or constitute an impact zone.

In this apparatus, the bars or pins of the rotary support means are spaced so as not to permit the passing of treated material grains across the trajectory of the bar circles without impacting or colliding with the bars thereof (see FIG. 12 and FIG. 13).

Every particle of radius $\rho$ will collide with at least one bar in every bar circle when the maximum spacing bar circle $m$ is defined by the following formula produced by the inventor in realizing his invention:

$$(P_1P_2')_m = \frac{2R_m(r+\rho)}{\sqrt{R^2_m - (R_{m-1}+r+\rho)^2}} \cdot \left[\frac{1+(R_{m-1}+r+)n_m}{R_{m-1} \cdot n_{m-1}}\right] \quad (1)$$

where $(P_1P_2')_m$ = maximum spacing between centres of two adjacent bars of bar circle $m$, in cm.;
$R_m$ = radius of bar circle, $m$ in cm.;
$R_{m-1}$ = radius of bar circle $m-1$, in cm.;
$r$ = radius of bar, in cm.;
$n_m$ = number of rotations of bar circle $m$ in r.p.m.
$n_{m-1}$ = number of rotations of bar circle $m-1$ in r.p.m.
$\rho$ = radius in cm. of grain of material to be processed.

This formula is applicable for those types of disintegrators specified in this invention. In practice, this formula has been used for disintegrators with the radius $R_m$ of the outermost bar circle varying within the limits 110–900 mm., the radius $r$ of the bars varying in the range 3–40 mm., and the distance $a+d$ between centers of two adjacent bars on a bar circle varying within the limits 17–250 mm. The r.p.m. varied in the range 400–4500 and the radius of the grains of the material to be processed, i.e. having a diameter or major dimension of from .2 micron to 2 inches.

It must be noted that the concentric circles of bars are radially spaced from each other preferably at a distance within the range of 10–250 mm., the number of said circles is preferably within the range of 3–8 and the number of bars on each circle is preferably within the range of 8–50.

To obtain a fine-grain material with properties as specified hereinbefore, the diameters, r.p.m. and number of bar circles, of both the external and internal rotors, must be chosen so as to ensure at least three successive impacts on any one particle, with a maximum interval between two successive impacts not exceeding 0.05 sec. In addition, the peripheral velocity of the innermost bar circles (of both the external and the internal rotor) and the velocity of grains at impacting with the rotor bars must be above 15 m./sec. Therefore, the rotation per second of the smallest bar circle of radius $R_1$ must be above $15/2\pi R_1$.

By referring to the drawings the design of the disintegrator will be better understood. FIG. 1 shows a disintegrator having two rotors.

The inner rotor 1 is located on a stationary frame 2, while the travelling frame 4 holds the outer rotor 3.

Figure 4:
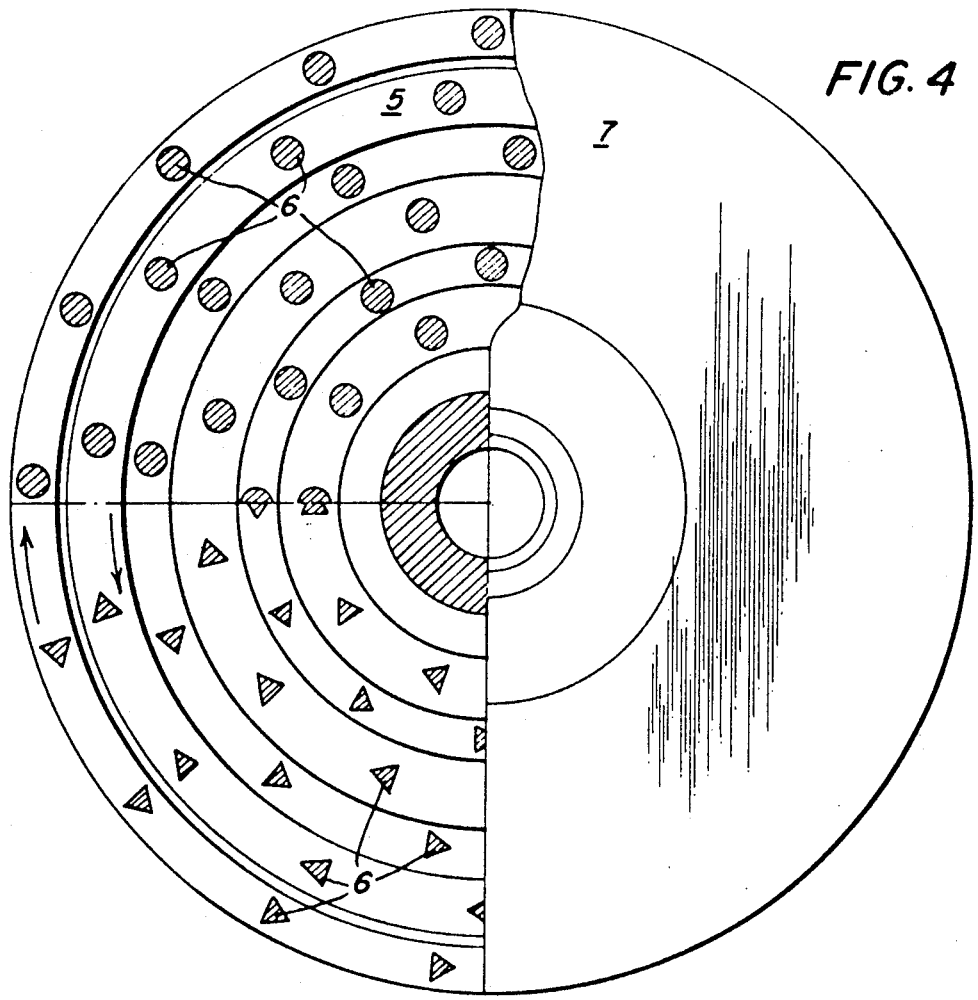
FIG. 4 is a cross-sectional view along line F—F shown on FIG. 3 having rotor bars of cylindrical and triangular cross-section.
Figure 8A:
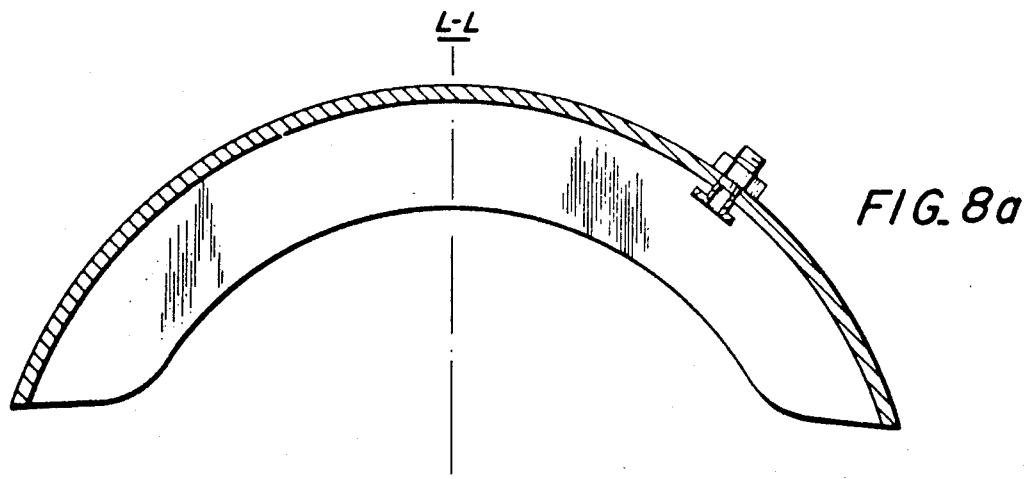
FIG. 8a is a sectional view taken along line L—L of FIG. 8.

Rotor bars 6 are positioned concentrically on disk 5 of inner rotor 1. Disk 7 of outer rotor 3 is also equipped with concentrically positioned bars. FIG. 1 and FIG. 3 show rotor bars of round cross-section, but bars may differ in cross-section, e.g. being rectangular or of other shape as shown in FIGS. 4 and 5, in which event the radius of each bar is that of the circle which circumscribes the particular shaped bar.

The disintegrator rotors 1 and 3 mounted on their respective shafts 8 and 9 have opposite rotation, to attain higher relative peripheral velocities and to prevent the rotors being destructed by the material processed, as may occur in comminutors having one rotating and one stationary rotor.

In the preparation of mixes to be used in casting building materials an empirical relationship has been found between certain elements of the disintegrator, the way of operation and the "degree of activation" (the increase in the specific surface of the mix caused by processing in the disintegrator); the "degree of activation" is in turn tied, by another relationship, to the physical characteristics of the finished building element.

These relationships permit a very convenient way of controlling the process.

To ensure the proper flexibility of operations it has been found expedient to equip the disintegrator either with multispeed A.C. motors, or D.C. motors having adjustable speed ranges, which permit the changing of disintegrator rotor speeds, according to the required degree of activation.

Either by choosing a disintegrator of suitable size, or by rotor speed adjustment, the desired degree of activation is attained, which is found by the following empirical formula:

$$e = c \cdot \sqrt{\frac{P_1 P_2'}{a+d} \text{ mean} \cdot \frac{1}{G} \cdot N_k^2 \cdot D_k^2} \quad (2)$$

where $e$ = the required degree of activation of material
$P_1 P'_2/a+d_{mean}$ = the mean value of the ratios of maximum permissible spacings between center lines of two adjacent in a bar circle (i.e. mean value of all bar circles), divided by the distance between centers of bars (see also definitions in Formula 1);
$a$ = actual spacing between two adjacent bars of a bar circle (see FIG. 13), polygonal in cm.; when using the bars of cross-section (e.g. rectangular or of other shape) in the Formula 2 as the actual spacing "$a$" must be determined as the actual spacing between the circumscribing of two adjacent bars of a bar circle;
$d$ = bar diameter (see FIG. 13) in cm.; polygonal when using bars of cross-section (e.g. rectangular or of other shape) in the Formula 2 the diameter $d$ must be determined as the diameter of the circle designed around the used cross-section;
$a+d$ = actual spacing between centers of two adjacent bars of a bar circle, FIG. 13, in cm.;
$G$ = quantity of materials to be processed in t./hrs.;
$N_k^2 D_k^2$ = is determined by the formula $$N_k^2 \cdot D_k^2 = 2(N_1^2 \cdot D_1^2 + N_2^2 \cdot D_2^2 + N_1^2 \cdot D_3^2 + \ldots N_{l-1}^2 \cdot D_{n-1}^2 + N_l^2 \cdot D_n^2) \quad (3)$$

where $D_{n-1}$ = diameter of the outermost but one bar circle, in cm.;
$N_{l-1}$ = r.p.m. of the outermost but one bar circle;
$N_1$ = number of rotations of the innermost bar circle, in r.p.m.;
$N_2$ = number of rotations of the bar circle next to the innermost bar circle, in r.p.m.;
$N_l$ = r.p.m. of the outermost bar circle;
$D_n$ = diameter of outermost bar circle in cm.;
If in Formula 2
$G$ = t./hrs.
$N_l$ = r.p.m.
$D_l$ = bar circle diameter in cm.
$c$ = factor dependent of the properties of the material to be processed, expressed in $\text{sec.}^{1.5}/\text{g.}^{0.5}$
then
$e$ is expressed in $\text{cm.}^2/\text{g}$.

For silicalcite mixes using standard sand (i.e. a natural sand obtained from the sand-pit "QUARTZ" of Tallin, Estonia with the following particle size distribution:

| Percent: | Mm. |
|---|---|
| 41.6 | 1.2–0.6 |
| 52.1 | 0.6–0.3 |
| 5.7 | 0.3–01.5 |
| 0.5 | 0.15–0.1 |
| 0.1 | 0.1 |

This sand has a $SiO_2$ content of 95%.
The value of $c$ is:

$$c = 63 \cdot 10^{-6}$$

As was mentioned above, the capability of a mix to give a certain finished building element is tied to its degree of activation $e$. In general, the quality of the mix is directly proportioned to the value $e$. The strength of silicalcite products in which sand having a quality index 1.0, depending on value $e$ is found by the empiral formula:

$$R = \frac{e \cdot a}{A \cdot e \cdot a + B} \quad (4)$$

where $R$ = strength (kg./cm.$^2$) of products having a density of 1.8 g./cm.$^3$
$A$ and $B$ = empiral coefficients, depending on the autoclaving procedure. A and B are obtained in the table below.

| | Steam pressure and curing temperature | | | | | | | | | |
|---|---|---|---|---|---|---|---|---|---|---|
| | 2 atm. (133° C.) | | 6 atm. (164° C.) | | 10 atm. (183° C.) | | 16 atm. (203° C.) | | 25 atm. (225° C.) | |
| Duration of steam curing, hrs. | A.10⁴ | B | A.10⁴ | B | A.10⁴ | B | A.10⁴ | B | A.10⁴ | B |
| 2 | | | | | 8.37 | 36.6 | 6.1 | 17.5 | 8.1 | 6 | 7.55 | 6.43 |
| 4 | | | | | 5.75 | 29 | 7.28 | 9.56 | 8.1 | 5.5 | 7.57 | 5.11 |
| 8 | 18.3 | 69 | 8.66 | 13.9 | 8.15 | 4.62 | 6.61 | 5.7 | 7.1 | 6.34 |
| 15 | 15.4 | 46 | 9.7 | 6.75 | 7.8 | 3.87 | 6.71 | 4.99 | 7.44 | 9.27 |
| 50 | 16.2 | 20.3 | 8.46 | 3.31 | 5.25 | 6.25 | 5.53 | 11.5 | 19.1 | 7.78 |

Brakes 12 and 13 are provided on the shafts 8 and 9 of the disintegrator.

The inner rotor shaft 8 passes through bearing housing 14. The drive motor 10 and brake 12 are mounted on the main frame 2.

The outer rotor shaft 9, bearing housing 15, drive motor 11 with brake 13 are mounted on the travelling frame 4. Bi-directional travel of the latter is effected by spindle, air cylinder or other means 16. The fixing device 17 provided on the travelling frame allows it to be locked in either of its extreme positions, i.e. with the rotors close, or with the rotors completely apart.

The disintegrator rotors are incorporated in a joint housing comprising body 18 and top cover 19, as shown in drawing 2. The end cover 20 of the housing located at the right-hand of the disintegrator is mounted on travelling frame 4. The housing body 18 is secured to the main frame. The top cover 19 being opened or closed either by means of pneumatic or hydraulic cylinder 21, turns about its articulated joint 22.

Packing 29 (see FIG. 3a) of foam-rubber or other resilient material, located between contiguous faces of top cover, end cover and the housing, ensure impermeability of latter. Packing 23 (see FIG. 3), located on and rotating with the rotor shafts serve to seal the housing with the disintegrator in operation; packings of the floating type, labyrinth, or equivalent may be used.

Raw materials pass into the disintegrator along feed chute 24 (see FIG. 3), which in addition supports a pipe 25 (see FIG. 3). The latter directs the flow of water into the space embraced by the rotors. Part of the water necessary for molding may be fed into the disintegrator along piping 26 (see FIG. 7).

Figure 10:
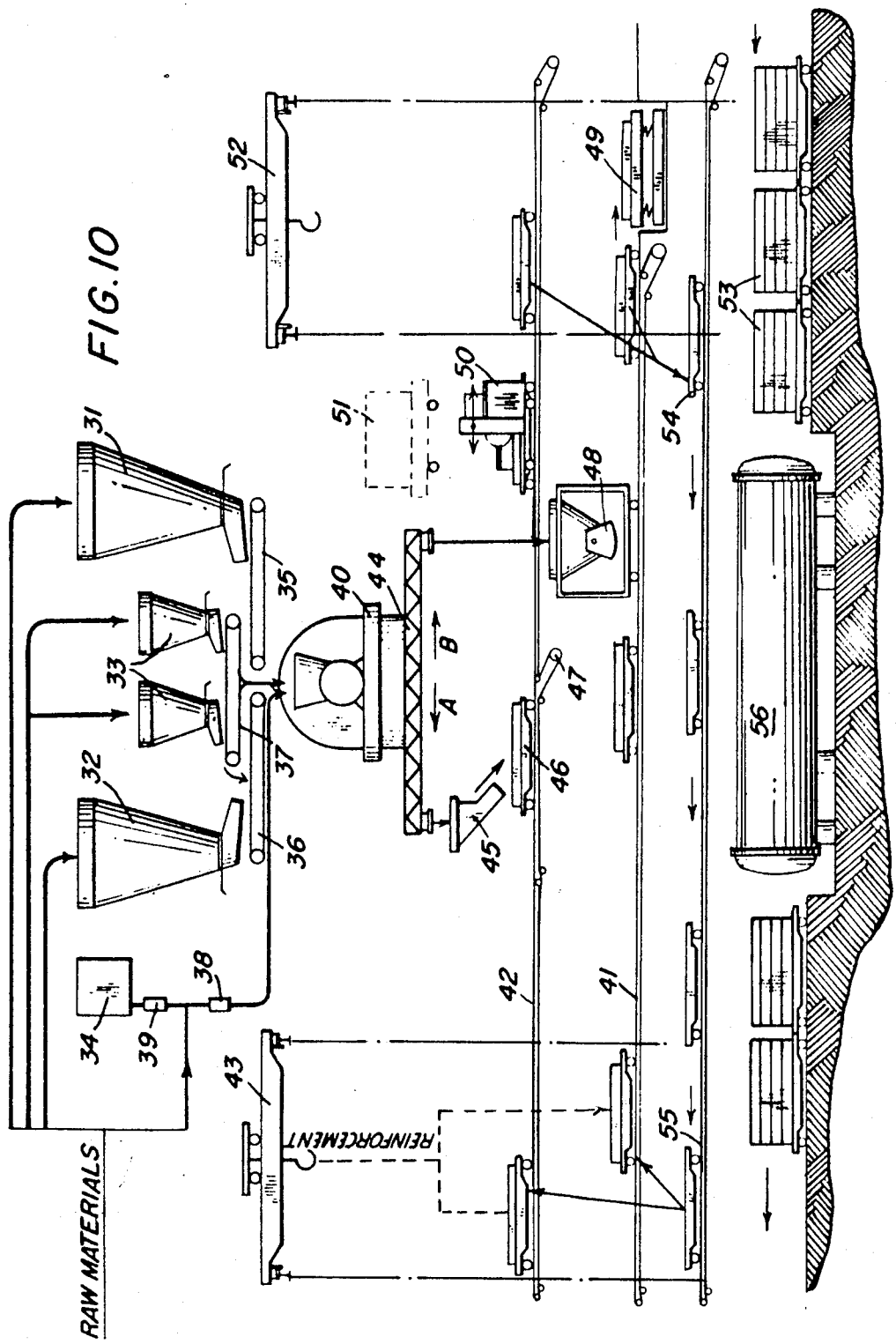
FIG. 10 is a diagrammatic view of the continuous process.

The production of silicalcite products according to the present invention could be done as shown in FIG. 10.

In accordance with the scheme of FIG. 10, all operations of grinding and making mixes are effected by a single apparatus. Thus high activation and homogenization of every mixture constituent is accomplished, resulting in high quality products.

It should be noted that the use of this invention eliminates the need of an additional equipment such as special blending units, water feeders, mixers for aluminum powder or other additives to be used in the silicalcite mix.

Therefore no provision has been made for any kind of transport facilities carrying dry mixes to such units or finished mixes from them to molding units.

Owing to this, the process of manufacturing mixes is extraordinarily simple, inexpensive and readily adapted to comprehensive automation.

The example below, based on the technological diagram, has been included to illustrate the arrangement of technological equipment as used in the manufacture of silicalcite.

Raw materials supplied at the plant (lime or ashes, etc., sand or pozzolan or losses or ashes etc.) are delivered into the hoppers 31–32. Other components (aluminum powder, pigments, etc.) are conveyed into hoppers 33. The disintegrator 40 is supplied with raw materials from hopper 31–32, water being fed in one with lime slaking retarders coming from tank 34, along corresponding water piping. At the same time aluminum powder, pigments and other materials are being dosed from hoppers 33 in quantities and ratios required, into the disintegrator 40. This is effected by the automatic controlled continuous dosers 35, 36, 37, 38 and 39. The degree of activation of the various components, differing for separate mixes when manufacturing different kind of products, is controlled by varying the rotative speed of the disintegrator rotors from the central control panel. The latter located in close vicinity of the molding site accommodates all accessories and devices required in controlling the supplying of raw materials, conveying operations, proper dosing of ingredients, the equipment used in pouring or placing mixes, shifting molds etc. In addition, all signalling devices and checking instruments are conveniently grouped on this control panel.

The various operations are controlled either automatically or manually by the operator.

Trolleys together with molds which have been refitted and prepared and have reinforcement positioned as per design, are carried by crane 43 from the mould stripping shop either to conveyer 41 for solid products, or to conveyer 42 for foamed products.

The activated and homogenized mix passes out of the disintegrator onto a reversible conveyer 44 for distribution as follows:

Trolleys with molds are passed on by conveyer 42 and reversible intermediate conveyer 47 and positioned under the mix discharge chute 43. The intermediate conveyer 47 is equipped with a mechanism for compacting the mix by vibration. If making mixes for cellular products, conveyor 44 operates in direction A and the mix is poured through chute 45 into the mold 46.

When the molds have been filled to the proper level the trolley is transferred to conveyer 42 and passed along to the track where solidification occurs.

With the conveyor 44 operating in direction B the mix for solid products is delivered into the hopper of the movable mixture placer 48 for conveying to the vibroplatform 49, or by other means of conveyance to the corresponding units for making sewage pipes, roof tiles, etc.

After solidification the molds containing cellular mixes are subjected to a special unit 50. When required, device 51 is employed in cutting the solidified green product into components differing in size. Waste material due screening is transferred into the sand hopper and together with sand they are fed again into the disintegrator.

Crane 52 transfers the molds containing green products to autoclave trolleys which are then collected into trains 53. Emptied trolleys are shifted to conveyer 35 and passed along to crane 43.

Solid mix in molds transferred by conveyer 41 to vibrostand 49 are lifted onto the vibrostand by crane 52.

Having been compacted by vibration the mix in molds is loaded on autoclave trolleys 53. The trolleys that have been unloaded are transferred to conveyer 55 and are returned to crane 43.

Such a continuous technological procedure is not limited to only the production of silicalcite, but is also applicable in the manufacture of products other than silicalcite.

Another variant based on the same principle is that of subjecting one ingredient of the mix, say sand, to disintegrator processing, and using another disintegrator to make the mix; to make the mix in the same disintegrator subsequent to sand processing.

Since some of the concepts and the basic principles of the invention have been elucidated the following examples are deemed worthy of consideration, as being illustrative of, but by no means limiting the invention.

The following table of examples summaries the percent by weight of the various components:

TABLE OF EXAMPLES

| Example No. | Sand | Lime | Water | Foaming agent | Density, kg./dm.³ | Strength, kg./cm.² |
|---|---|---|---|---|---|---|
| 1 | 86 | $14\left(\frac{10}{70}\cdot 100\right)$ | 16 | | 1.78 | 450 |
| 2 | 83 | $17\left(\frac{12}{70}\cdot 100\right)$ | 13 | | 1.89 | 730 |
| 3 | 77 | $23\left(\frac{16}{70}\cdot 100\right)$ | 8 | | 1.8 | 1,100 |
| 4 | 74 | $26\left(\frac{18.5}{70}\cdot 100\right)$ | 8 | | 1.85 | 1,930 |
| 5 | 71 | $29\left(\frac{20.5}{70}\cdot 100\right)$ | 9 | | 1.85 | 2,450 |
| 6 | 69 | $31\left(\frac{22}{70}\cdot 100\right)$ | 10 | | 1.9 | 3,250 |
| 9 | 76 | $24\left(\frac{8}{70}\cdot 100+\frac{12}{90}\cdot 100\right)$ | 33 | ¹ 0.04 | 0.95 | 325 |
| 10 | 76 | $24\left(\frac{8}{70}\cdot 100+\frac{12}{90}\cdot 100\right)$ | 28 | ¹ 0.015 | 1.2 | 510 |
| 11 | 79 | $21\left(\frac{5.4}{70}\cdot 100+\frac{12.6}{95}\cdot 100\right)$ | 30 | ² 0.015 | 1.12 | 310 |
| 12 | 83 | $17\left(\frac{12}{70}\cdot 100\right)$ | 13 | | 1.92 | 1,080 |
| 13 | 79 | $21\left(\frac{4.5}{58}\cdot 100+\frac{10.5}{80}\cdot 100\right)$ | 31 | ¹ 0.2 | 1.12 | 210 |
| 14 | 76 | $24\left(\frac{4.8}{52}\cdot 100+\frac{11.2}{75}\cdot 100\right)$ | 34 | ¹ 0.03 | 0.97 | 205 |
| 15 | 77 | $23\left(\frac{12}{52}\cdot 100\right)$ | 18 | | 1.63 | 370 |
| 16 | 68 | $32\left(\frac{16}{50}\cdot 100\right)$ | 10 | | 1.8 | 740 |
| 17 | 65 | $35\left(\frac{5.85}{48}\cdot 100+\frac{13.65}{60}\cdot 100\right)$ | 34 | ¹ 0.03 | 1.18 | 220 |
| 18 | 73 | $27\left(\frac{15}{55}\cdot 100\right)$ | 9.5 | | 1.8 | 590 |
| 21 | 73 | $27\left(\frac{5.25}{55}\cdot 100+\frac{12.25}{70}\cdot 100\right)$ | 43 | ¹ 0.02 | 1.08 | 205 |
| 22 | 70 | $30\left(\frac{14}{46.3}\cdot 100\right)$ | 9 | | 1.8 | 590 |

¹ Aluminum.
² 60% glue and 40% soap.

EXAMPLE 1

Raw materials used:

(a) standard silica sand of the sand-pit "Quartz," SIO₂ content 95%, specific surface 100 cm.²/g.; (the specific surface was measured by means of the Blaine apparatus).
(b) powdered slack lime active CaO content 70%.
(c) water.

The constituents were dosed into the disintegrator the percentage content of active CaO in the mix being 10% with the moisture 16%. (All the percentages in this and in the other examples are given on the basis of the weight of the dry mix). Degree of activation in processing (see Formula 2), $e = 300$ cm.²/g.; impact velocity 90 m./sec. 5 impacts After processing the mix was placed into molds and vibrated at a frequency 300 c./sec., amplitude 0.5 mm., duration 1.5 min.

Green products were autoclave-cured 8 hrs. at 12 atg. pressure. Density of finished product 1.78 t./m.³; compressive strength 450 kg./cm.².

EXAMPLE 2

Raw materials used: same as in Example 1. The constituents were dosed into the disintegrator, the percentage content of active CaO in the mix being 12% with the moisture 13%. Degree of activation in processing (see Formula 2), $e = 350$ cm.²/g.; impact velocity 100 m./sec., 5 impacts After processing the mix was placed into molds and vibrated under load 0.5 kg./cm.² at a frequency 3000 c./sec., amplitude 0.45 mm., duration 1.0 min.

Green products were autoclave-cured 8 hrs., at 12 atg. pressure. Density of finished product 1.89 t./m.³. Compressive strength 730 kg./cm.².

EXAMPLE 3

Raw materials: same as in Example 1.

The constituents were dosed into the disintegrator, the percentage content of active CaO in the mix being 16%, with 8% moisture. Degree of activation in processing (see Formula 2), $e = 900$ cm.²/g.; 5 impacts at velocity 140 m./sec.

Mix was compacted to density 1.8 t./m.³ by pressing, required molding pressure 180 kg./cm.².

Products were autoclave-cured 7 hrs. at a pressure 12 atg. Compressive strength of finished product 1100 kg./cm.².

EXAMPLE 4

Raw material: same as in Example 1.

The constituents were dosed into the disintegrator, the percentage content of active CaO in the mix 18.5%, with 8% moisture. Degree of activation in processing (see Formula 2), $e=1400$ cm.$^2$/g.; 7 impacts at velocity 160 m./sec.

Density 1.85 t./m.$^3$, required molding pressure 320 kg./cm.$^2$.

Green products were autoclave-cured 10 hrs. at a pressure 12 atg.

Compressive strength of finished product 1930 kg./cm.$^2$.

EXAMPLE 5

Raw materials: same as in Example 1.

The constituents were dosed into the disintegrator, the percentage content of active CaO in the mix 20.5%, with 9% moisture. Degree of activation in the processing (see Formula 2), $e=1500$ cm.$^2$/g.; 7 impacts at velocity 160 m./sec.

Density 1.85 t./m.$^3$, required molding pressure 370 kg./cm.$^2$.

Green products were autoclave-cured 12 hrs. at a pressure 12 atg.

Compressive strength of finished product 2450 kg./cm.$^2$.

EXAMPLE 6

Raw materials: same as in Example 1.

The constituents were dosed into the disintegrator, the percentage content of active CaO in the mix 22.0%, with 10% moisture. Degree of activation in processing (see Formula 2), $e=1800$ cm.$^2$/g.; 7 impacts at velocity 200 m./sec.

Density 1.90 t./cm.$^3$, required molding pressure 550 kg./cm.$^2$.

Green products were autoclave-cured 16 hrs. at a pressure 12 atg.

Compressive strength of finished product 3250 kg./cm.$^2$.

EXAMPLE 7

Raw materials used:

(a) standard silica sand, SiO$_2$ content 95%, specific surface 100 cm.$^2$/g.;
(b) ground quick lime, active CaO content 90%;
(c) powdered slack lime, active CaO content 70%;
(d) water;
(e) aluminum powder.

All constituents were dosed into the disintegrator, the percentage content of active CaO in the mix 22%, of which 2/10 were due to slaked, and 8/10 to quick lime, water content in mix 48%, aluminum powder 0.13%.

Degree of activation in processing (see Formula 2).

$e=1800$ cm.$^2$/g.; 7 impacts at velocity 180 m./sec.

The processed mix was molded by pouring into metal molds. After solidification the green products were autoclave-cured 11 hr. at a pressure 12 atg. Density of resultant products 0.41 t./m.$^3$, compressive strength 45 kg./cm.$^2$.

EXAMPLE 8

Raw materials used: same as in Example 7.

All constituents were dosed into the disintegrator, the percentage content of active CaO in the mix 22%, of which 3/10 were due to slaked, and 7/10 due to quick lime; water content in mix 42%, aluminum powder 0.09%.

Degree of activation in processing (see Formula 2).

$e=1800$ cm.$^2$/g.; 8 impacts at velocity 180 m./sec.

The processed mix was moulded by pouring into metal molds. After solidification the green products were autoclave-cured 12 hrs., at a pressure 12 atg.

Density of resultant products 0.62 t./m.$^3$, compressive strength 125 kg./cm.$^2$.

EXAMPLE 9

Raw materials used: same as in Example 7.

All constituents were dosed into the disintegrator, the percentage content of active CaO in the mix 20%, of which 4/10 was due to slaked, and 6/10 due to quick lime; water content in mix 33%, and aluminum powder 0.04%.

Degree of activation in processing (see Formula 2).

$e=1600$ cm.$^2$/g.; 7 impacts at velocity 180 m./sec.

The processed mix was molded by pouring into metal molds. After solidification the green products were autoclave cured 12 hrs., at a pressure 12 atg. Density of resultant products 0.95 t./m.$^3$, compressive strength 325 kg./cm.$^2$.

EXAMPLE 10

Raw materials used: same as in Example 7.

All constituents were dosed into the disintegrator, the percentage content of active CaO in the mix 20%, of which 4/10 was due to slaked, and 6/10 due to quick lime; water content in mix 28%; and aluminum powder 0.015%.

Degree of activation in processing (see Formula 2).

$e=1500$ cm.$^2$/g.; 7 impacts at velocity 140 m./sec.

The processed mix was molded by pouring into metal molds. After solidification the green products were autoclave-cured 12 hrs., at a pressure 12 atg. Density of resultant products 1.20 t./m.$^3$, compressive strength 510 kg./cm.$^2$.

EXAMPLE 11

Raw materials used:

(a) sand, SiO$_2$ content 76%, initial specific surface 60 cm.$^2$/g.;
(b) lime, active CaO content 95%
(c) powdered slack lime, active CaO content 70%
(d) water
(e) foam-builder composed of about 60% carpenter's glue, and about 40% calophony soap.

The constituents were dosed into the disintegrator, the percentage content of active CaO in the mix 18%, of which 3/10 was due to slaked; and 7/10 due to quick lime; moisture 30%, the foam-builder was 0.015%.

Degree of activation in processing, $e=1300$ cm.$^2$/g.; 5 impacts at velocity 14 m./sec.

The foam-builder was introduced into the mix 120 g. per 1 m.$^3$ dry ingredients, and thoroughly blended in a special continuous mixer.

The green products were autoclave-cured 9 hrs., at a pressure 12 atg. Density of resultant products 1.12 t./m.$^3$, compressive strength 310 kg./cm.$^2$.

EXAMPLE 12

Raw materials used:

(a) sand, SiO$_2$ content 76%
(b) powdered slaked lime, active CaO content 70%
(c) water.

The constituents were dosed into the disintegrator, the ctive CaO content in the mix was 12% with 13% moisture.

Degree of activation in processing, $e=700$ cm.$^2$/g.; 5 impacts at velocity 80 m./sec.

The mix was moulded by vibro-pressing; vibration frequency 3000 c./min., amplitude 0.45 mm., molding pressure 6.5 kg./cm.$^2$.

The green products were autoclave-cured 9 hrs., at 12 atg. pressure. Density of finished products 1.92 t./m.$^3$, compressive strength 1080 kg./cm.$^2$.

EXAMPLE 13

Raw materials used:

(a) sand, SiO$_2$ content 66.2%, initial specific surface 420 cm.$^2$/g.;
(b) ground quick lime, active CaO content 80%
(c) powdered slack lime, active CaO content 58%
(d) water
(e) aluminum powder.

By appropriate proportioning the constituents the mix obtained an active CaO content of 75%, 3/10 was due to slacked, and 7/10 due to quick lime. Moisture of mix 31%; aluminum powder 0.20%.

Degree of activation in processing 500 cm.$^2$/g., 5 impacts at velocity 120 m./sec.

Green-products were autoclave-cured 10 hrs. at a pressure 10 atg. Density of finished product 1.12 t./m.$^3$, compressive strength 210 kg./cm.$^2$.

EXAMPLE 14

Raw materials used:

(a) sand, SiO$_2$ content 65.8%, initial specific surface 300 cm.$^2$/g.
(b) ground quick lime, active CaO content 75%
(c) powdered slack lime, active CaO content 52%
(d) water
(e) aluminum powder.

The constituents were dosed into the disintegrator, the active CaO content in the mix was 16%, of which 3/10 was due to slaked, and 7/10 due to quick lime. Moisture of the mix was 34% and aluminum powder 0.03%.

Degree of activation in processing 950 cm.$^2$/g., 5 impacts at velocity 120 m./sec.

The mix was poured. The green products were autoclave-cured 12 hrs., at 10 atg. pressure.

Denity of resultant products 0.97 t./m.$^3$; compressive strength 205 kg./cm.$^2$.

EXAMPLE 15

Raw materials used:

(a) sand, SiO$_2$ content 65.8%, initial specific surface 300 cm.$^2$/g.
(b) powdered slack lime, active CaO content 52%
(c) water.

The constituents were dosed into the distintegrator in proportions yielding a mix of 12% active CaO content, moisture 18%.

Degree of activation in processing 200 cm./g., 5 impacts at velocity 80 m./sec.

The mix was moulded by vibration at a frequency 3000 c./min., amplitude 0.6 mm., duration 2 min.

The green products were autoclave-cured 8 hrs., at 10 atg. pressure.

Density of resultant products 1.63 t./m.$^3$; compressive strength 370 kg./cm.$^2$

EXAMPLE 16

Raw materials used:

(a) loess, SiO$_2$ content 54%, initial specific surface 3500 cm.$^2$/g.
(b) powdered slack lime, active CaO content 50%
(c) water The constituents were dosed into the distintegrator in proportions yielding a mix of 16% active CaO content, moisture 10%.

Degree of activation of the mix in processing $e=300$ cm.$^2$/g.; 6 impacts at velocity 80 m./sec.

The products were molded by pressure to a density 1.8 t./m.$^3$ and were autoclave-cured 10 hrs., at 10 atg. pressure. Compressive strength of resultant products 740 kg./cm.$^2$.

EXAMPLE 17

Raw materials used:

(a) loess, SiO$_2$ content 54%, initial specific surface 3500 cm.$^2$/g.
(b) ground quick lime, active CaO content 60%
(c) powdered slack lime, active CaO content 48%
(d) water
(e) aluminum powder.

The constituents were dosed into the disintegrator in proportions yielding a mix of 19.5%, of which 3/10 were due to slaked, and 7/10 to quick lime.

Degree of activation in processing $e=1150$ cm.$^2$/g.; 6 impacts at a velocity 120 m./sec.

The products were molded by pouring into metal molds and were autoclave-cured 10 hrs., at 8 atg. pressure.

Density of resultant products 1.18 t./m.$^3$.
Compressive strength 220 kg./cm.$^2$.

EXAMPLE 18

Raw materials used:

(a) clay sand, SiO$_2$ content 48%, clay content 22%, initial specific surface 1040 cm.$^2$/g.
(b) powdered slack lime, active CaO content 55%
(c) water The constituents were dosed into the disintegrator in proportions yielding a mix of 15%, moisture 9.5%.

Degree of activation of mix in processing $e=150$ cm.$^2$/g.; 5 impacts at a velocity 80 m./sec.

The products were molded by pressing to a density 1.8 t./m$^3$. and were autoclave-cured 8 hrs. at 10 atg. pressure. Compressive strength of resultant products 590 kg./cm.$^2$.

EXAMPLE 19

Raw materials used:

(a) clay sand, SiO$_2$ content 48%, clay content 22%; initial specific surface 1040 cm.$^2$/g.
(b) ground quicklime, active CaO content 70%
(c) powdered slack lime, active CaO content 55%
(d) water
(e) aluminum powder.

The constituents were dosed into the disintegrator in proportions yielding a mix of 17.5%, of which 3/10 were due to slaked and 7/10 due to quick lime. Moisture 43%, aluminum powder 0.10%.

Degree of activation of the mix in processing $e=400$ cm.$^2$/g.; 5 impacts at a velocity 120 m./sec.

The products were moulded by pouring into metal moulds and autoclave-cured 8 hrs. at 10 atg. pressure.

Density of resultant products 0.59 t./m.$^3$, compressive strength 45 kg./cm.$^2$.

EXAMPLE 20

Raw materials used: same as in Example 19.

The constituents were dosed into the disintegrator in proportions yielding a mix of 17.5% active CaO content, of which 3/10 were due to slaked, and 7/10 due to quick lime. Moisture 43% and aluminum powder 0.035%.

Degree of activation of the mix in processing $e=400$ cm.$^2$/g.; 5 impacts at a velocity 120 m./sec.

The products were molded by pouring into metal molds and autoclave-cured 8 hrs. at 10 atg. pressure.

Density of resultant products 0.93 t./cm.$^3$. Compressive strength 120 kg./cm.$^2$.

EXAMPLE 21

Raw materials used: same as in Example 19.

The constituents were dosed into the disintegrator in proportions yielding a mix of 17.5% active CaO content, of which 3/10 were due to slake, and 7/10 due to quick lime. Moisture 43%, aluminum powder 0.020%.

Degree of activation of mix in processing $e=400$ cm.$^2$/g.; 5 impacts at a velocity 120 m./sec.

The products were molded by pouring into metal molds and autoclave-cured 8 hrs. at 10 atg. pressure.

Density of resultant products 1.08 t./m.$^3$ compressive strength 205 kg./cm.$^2$.

EXAMPLE 22

Raw materials used:

(a) sand, SiO$_2$ content 82%, initial specific surface 200 cm.$^2$/g.
(b) carbide waste, active CaO content 46.3%
(c) water The constituents were dosed into the disintegrator in proportions yielding a mix of 14% active CaO content; moisture 9%.

Degree of activation in the mix in processing $e=320$ cm.$^2$/g., 5 impacts at a velocity 80 m./sec.

The products were molded by pressing to a density 1.8 t./m.$^3$ and autoclave-cured 8 hrs. at 8 atg. pressure. Compressive strength of resultant products 590 kg./cm.$^2$.

EXAMPLE 23

Raw materials used:

(a) iron ore powder of a composition as follows:

|  | Percent |
|---|---|
| FeO | 24.75 |
| Fe$_2$O$_3$ | 55.17 |
| CaO | 3.20 |
| MgO | 0.62 |
| SiO$_2$ | 16.85 |
| S | 0.04 |

Initial specific surface 790 cm.$^2$/g.

(b) powdered slack lime, active CaO content 48%
(c) water

The constituents were dosed into the disintegrator in proportions yielding a mix of 4.4% active CaO, moisture 7%.

Degree of activation of mix $e=200$ cm.$^2$/g.; 5 impacts at a velocity 60 m./sec.

The products were molded by applying 200 kg./cm.$^2$ pressure and autoclave-cured 4 hrs. at 10 atg. pressure. Density of resultant products 2.54 t./m.$^3$; compressive strength 245 kg./cm.$^2$.

EXAMPLE 24

Raw materials used: same as in Example 23.

The constituents were dosed into the disintegrator in proportions yielding a mix of 4.4% active CaO content, moisture 7%.

Degree of activation of mix in processing $e=200$ cm.$^2$/g.; 5 impacts at a velocity 60 m./sec.

The products were molded by applying 800 kg./cm.$^2$ and autoclave-cured 4 hrs. at 10 atg. pressure. Density of resultant products 2.70 t./m.$^3$; compressive strength 415 kg./cm.$^2$.

EXAMPLE 25

Raw materials used: same as in Example 23.

The constituents were dosed into the disintegrator in proportions yielding a mix of 5.6% active CaO content, moisture 7.5%.

Degree of activation of the mix in processing:

$e=450$ cm.$^2$/g.; 5 impacts at a velocity 120 m./sec.

The products are molded by applying 200 kg./cm.$^2$ pressure, and autoclave-cured 4 hrs. at 10 atg. pressure. Density of resultant products 2.67 t./m.$^3$; compressive strength 350 kg./cm.$^2$.

EXAMPLE 26

Raw materials used: same as in Example 23.

The constituents were dosed into the disintegrator in proportions yielding a mix of 5.6% active CaO content; moisture 7.5%.

Degree of activation of the mix in processing:

$e=450$ cm.$^2$/g.; 5 impacts at a velocity 120 m./sec.

The products were molded by applying 800 kg./cm.$^2$ pressure and autoclave-cured 4 hrs. at 10 atg. pressure.

Density of resultant products 2.87 t./m.$^3$; compressive strength 567 kg./cm.$^2$.

EXAMPLE 27

Raw materials used: same as in Example 23, but without using lime.

The iron ore concentration was processed in the disintegrator adding water in required amount (6%), at a degree of activation $e=300$ cm.$^2$/g.; 6 impacts at a velocity 70 m./sec.

The products were molded by applying 200 kg./cm.$^2$ pressure and autoclave-cured 4 hrs. at 10 atg. pressure. Density of resultant products 2.64 t./m.$^3$; compressive strength 287 kg./cm.$^2$.

EXAMPLE 28

Raw materials used: same as in Example 23, but without using lime.

The iron ore concentration was processed in the disintegrator adding water in required amount (6%) at a degree of activation.

$e=300$ cm.$^2$/g.; 6 impacts at a velocity 70 m./sec.

The products were molded by applying 800 kg./cm.$^2$ pressure and autoclave-cured 4 hrs. at 10 atg. pressure.

Density of resultant products 2.84 t./m.$^3$. Compressive strength 503 kg./cm.$^2$.

EXAMPLE 29

Natural sand containing SiO$_2$—90%; CaO—3%; MgO—2%; Al$_2$O$_3$—2%; Fe$_2$O$_3$—3% and portland cement, grade 400 according to GOST 310-60 (U.S.S.R. Government Standards).

In processing both constituents in the disintegrator, the impact velocity of particles was 40 m./sec. with every particle subjected to 3 impacts. The weight ratio of sand-cement was 1:3. Both constituents treated were in dry condition.

After disintegration water was introduced into the mix so as to make the water-cement ratio 0.4.

From this mix cylinders were molded by pressing, and attained a density 1.8 g./cm.$^3$.

The test specimens were subjected to different conditions of hardening:

(a) in a steam chamber at a temperature 90°, 16 hrs.
(b) in water—28 days

Mixes were also made using the same natural sand and the same grade of portland cement in proportions as above, and by the method prescribed by the Standard Specifications for Determination of Cement Grade. (GOST 310–60). The test specimens were subjected to similar conditions of hardening. Test specimens made from non-disintegrated mixes and having hardened in the steam chamber attained a compressive strength 219 kg./cm.$^2$, whereas specimens made of disintegrated mixes, and having hardened in like conditions, displayed a compressive strength 333 kg./cm.$^2$. The compressive strength of water cured specimens, made from conventional mixes, was 180 kg./cm.$^2$, against the compressive strength 282 kg./cm.$^2$ of water cured specimens made from distingrated mixes.

EXAMPLE 30

Raw materials used:
Natural sand having a granulometric composition as follows:

| Mesh dia., mm.: | Residue on sieve, percent |
|---|---|
| 2.5 | 0.9 |
| 1.0 | 8.1 |
| 0.6 | 21.6 |
| 0.3 | 42.4 |
| 0.15 | 13.3 |
| 0.1 | 12.6 |
| 0.1 | 1.1 | and portland cement grade 400.

The particles of both raw materials processed in the disintegrator were subjected to 3 impacts each at the velocity 45 m./sec. The mix moistened to the water-cement ratio w./c.=0.4, was used in molding cubes, which were vibration-compacted. Density of cubes 2.02 g./cm.$^3$.

Other mixtures were made in the conventional manner prescribed by the Cement Grade Specifications (GOST 310–60) and using the same grade of cement and the same natural sand. The density of these vibration-compacted cubes equalled 1.93 g./cm.$^3$.

Both, the cubes made from disintegrated mixes and those made from conventional mixes, were simultaneously subjected to hardening in one and the same steam chamber for 24 hours.

The cubes made from disintegrated mixes attained a compressive strength 555 kg./cm.$^2$ against the compressive strength 265 kg./cm.$^2$ of the cubes made from non-disintegrated mixes.

EXAMPLE 31

Natural sand with SiO$_2$ content 68%, and clay content 12.5% were processed in the disintegrator in conjunction with cement grade 400, in proportions 1:3. Water was introduced into the mix to the water-cement ratio 0.3. The ready mix was used in making vibration-compacted cubes which were subjected to hardening at normal temperature 28 days.

At the same time other test specimens were made from mixes processed in the conventional manner (GOST 310–60). The raw materials used, i.e. sand and cement were the same and corresponding in all properties to those mentioned above. Hardening conditions were alike for both kinds of specimens. The specimens made from disintegrated mixes, displayed a compressive strength 282 kg./cm.$^2$, whereas those made from conventional mixes, attained a compressive strength of only 198 kg./cm.$^2$.

EXAMPLE 32

A sample of wheat, 772 g./e., containing: moisture 14.2%, ashes 1.76%, mineral admixtures 0.1%, organic admixtures 2.7%, gluten 24.3%, glassiness 37%.

In grinding the wheat a disintegrator and an industrial wheat mill were used. Results obtained are shown below (once through):

|  | Disintegrator, percent | Industrial mill, percent |
|---|---|---|
| Flour yield | 73 | 36 |
| Ashes | 0.48 | 0.53 |

Quality of bread made of the respective flour:

|  | Disintegrator | Industrial mill |
|---|---|---|
| Bread, yield per 100 g. flour, litres | 0.5 | 0.46 |
| Height dia., ratio of bread, h./d | 0.5 | 0.46 |
| Degustation test results on bread quality, points | 27 | 24 |

EXAMPLE 33

Pieces of gas silicalcite (i.e. cellular silicalcite) made from disintegrator-processed sand-lime mixes, containing 15% active lime CaO and 85% sand, and autoclave-cured 12 hours at 10 atg. pressure were used. Their density equalled 0.9 g./cm.$^3$.

By crushing the gas silicalcite pieces chips were obtained, which did not exceed 10 mm. in size. Further, the chips fed into the disintegrator by continuous dosing were subjected to 7 impacts each at an impact velocity 180 m./sec. After processing, the resultant particles were found to have a specific surface 1800 cm.$^2$/g., as determined by means of Blaines' apparatus.

Next, the powdered silicalcite was put through a sieve, mesh dia. 0.088 mm. the residue retained on the sieve was again disintegrator-treated.

After sieving the silicalcite powder in 20% amounts was added to such paints, varnishes and glues as listed here: oil paints (some containing natural boiled linseed oil, others synthetic drying oils, e.g. obtained from shale-oil called "oxol," varnishes epoxide-resin, glues, glue "DFK" and so forth.

Test data thus far obtained show that owing to the addition in 20% amounts of silicalcite powder, activated in the disintegrator, the said paints, varnishes and glue show improved polymerization and dry twice as rapidly as compared with such not containing silicalcite powder. In addition to enhanced abrasion resistance (2–5 times) the paints and varnishes displayed an increase, by 2 to 3 times, in weather resistance. The bonding strength of epoxide-resin glues and that of DFK type glue was increased by 2–3 times with a 6% decrease in expenditure.

In the above, specific information has been provided as to both the disintegrator used in the concept of the present invention. However, some comment must be set forth regarding the utilization of the disintegrator of the present invention and the specific parameters set forth in the above. It has been observed that many properties of the sand due to the present treatment are varied over the grinding techniques of sand as accomplished by prior art devices, such as ball mills and vibration mills. It should also be pointed out that the present invention does not pertain only to the treatment of sand in conjunction with a binder, but, relates to the treatment of sand and ores, per se. The further fact that a binder is included along with water in order to establish an intimate mixture is a further fruition of carrying out the concepts of the present invention.

In the following, some further invention is provided in comparison of the comminuting techniques of sand in the device of the present invention, grinding mills of the type known as ball mills, and vibration mills. It has been established that sands ground in the various machines differ from each other in a number of ways.

In a disintegrator each grain of sand is made smaller independently of the other grains by impacts against the disintegrator members. When the sand is ground in this way the particles obtained are of an identical shape for any fineness of grinding. In a ball mill, the large grains are the first to be ground. In a vibration mill the large grains are abraded due to the small force of the impacts.

In the particles of sand ground in a ball mill a high percentage of the measured angles between the plane faces of the grains approximate 90°, while in sand ground in a disintegrator of the present invention the number of such angles is half of this value.

Additionally, it was discovered that there is considerable of the grinding techniques of the present invention as compared to prior art methods in the granulometric composition of sand that was ground by prior art methods and the present method.

For instance, this can be readily seen from Tables 1 and 2.

TABLE 1

| Grinding machine | Disintegrator | Ball mill | Vibrator mill |
|---|---|---|---|
| Number of grains over 1 micron in size | 221 | 287 | 291 |
| Number of plane faces | 455 | 397 | 459 |
| Number of plane faces per grain (average) | 2.06 | 1.38 | 1.58 |
| Percentage of area of plane faces over the total area of a grain | 18.07 | 10.4 | 12.2 |
| Number of angles | 157 | 133 | 151 |
| Number of angles per grain | 0.71 | 0.46 | 0.52 |

TABLE 2

| Sand fractions, mm. in size | Content of fraction in sand, percent | | | | | | | Specific surface of— | |
|---|---|---|---|---|---|---|---|---|---|
| | 1.2 | 0.6 | 0.3 | 0.15 | 0.10 | 0.05 | 0.01 | Sand, sq. cm./g. | Particles contained in sand, less than 0.1 mm. in size (pulverized) sq. cm./g. |
| | 0.6 | 0.3 | 0.15 | 0.10 | 0.05 | 0.01 | 0 | | |
| Index: | | | | | | | | | |
| 1 | 41.6 | 52.1 | 5.7 | 0.5 | 0.1 | 0.0 | 0.0 | 85 | 460 |
| 2 | 26.6 | 55.2 | 11.8 | 2.8 | 2.5 | 1.0 | 0.1 | 136 | 1,100 |
| 3 | 28.9 | 54.6 | 9.3 | 3.3 | 1.7 | 1.9 | 0.3 | 161 | 1,049 |
| 4 | 31.6 | 49.8 | 11.0 | 4.3 | 2.0 | 1.1 | 0.2 | 151 | 1,395 |
| 5 | 5.0 | 32.1 | 24.6 | 10.6 | 14.0 | 11.9 | 1.8 | 418 | 1,250 |
| 6 | 6.9 | 48.1 | 20.4 | 6.7 | 7.4 | 8.2 | 2.3 | 396 | 1,845 |
| 7 | 18.2 | 34.1 | 22.6 | 7.8 | 6.4 | 8.7 | 2.2 | 466 | 2,150 |
| 8 | 1.1 | 15.3 | 21.2 | 11.2 | 21.0 | 26.1 | 4.1 | 934 | 1,544 |
| 9 | 0.1 | 29.8 | 28.3 | 12.7 | 10.1 | 14.1 | 4.9 | 865 | 2,292 |
| 10 | 10.6 | 22.3 | 22.3 | 10.5 | 10.6 | 17.7 | 6.1 | 823 | 2,330 |
| 11 | 0.8 | 0.96 | 16.0 | 10.2 | 18.5 | 28.1 | 6.8 | 1,165 | 1,915 |
| 12 | | 7.1 | 32.0 | 16.7 | 18.2 | 20.0 | 6.1 | 1,156 | 2,343 |
| 13 | 4.3 | 11.9 | 23.8 | 14.0 | 13.2 | 24.6 | 8.2 | 1,210 | 2,340 |
| 14 | 0.1 | 3.0 | 8.8 | 7.1 | 19.5 | 48.1 | 13.4 | 2,030 | 2,359 |
| 15 | | 0.2 | 10.8 | 15.1 | 26.7 | 35.0 | 12.2 | 1,802 | 2,264 |
| 16 | 0.7 | 1.9 | 11.0 | 12.7 | 20.8 | 29.6 | 16.3 | 1,935 | 2,450 |

Note: Meaning of the column "Index":
1—No grinding (natural sand).
2—Grinding in the disintegrator 0:1,968 r.p.m.
3—Grinding in the ball mill during 0.1 hr.
4—Grinding in the vibration mill during 2 min.
5—Grinding in the disintegrator 2,870/3,550 r.p.m.
6—Grinding in the ball mill during 4 hrs.
7—Grinding in the vibration mill during 7 min.
8—Grinding in the disintegrator 6,888/3,550 r.p.m.
9—Grinding in the ball mill during 7 hrs.
10—Grinding in the vibration mill during 9 min.
11—Grinding in the disintegrator 4,592/5,822 r.p.m.
12—Grinding in the ball mill during 10 hrs.
13—Grinding in the vibration mill during 12 min.
14—Grinding in the disintegrator 10.906/3,550 r.p.m.
15—Grinding in the ball mill during 20 hrs.
16—Grinding in the vibration mill during 20 min.

Now, let us consider the distribution of the sand by fractions depending upon its specific surface and in relationship to Table 2 stated in the above. For grinding in a disintegrator the results if plotted in a graph will show curves of the various sand fractions which are of the same shape. This is the result of all the fractions of the sand being crushed by the disintegrator, irrespective of the grain sizes.

As the fineness of grinding grows in any of the machines, the number of particles of the under 0.01 mm. fraction increases. Grinding in a disintegrator yields the smallest number of such particles, while a greater fineness of grinding results in their almost linear increase. When sand is ground in a ball mill and a vibration mill to a specific surface of about 800 sq. cm./g., the number of particles of this fraction rapidly grows, while with a further increase in the fineness of the sand their growth is reduced, the decrease in the ball mill taking place to a greater extent. The phenomenon of a sharp decrease in the formation of fine particles in a ball mill for great fineness of the grinding can be explained by the formation of new larger particles out of the crushed fine particles.

The above results fully conform to those obtained when determining the specific surface of particles under 0.1 mm. in size (dust). As can be seen from the data in Table 2, for grinding in a disintegrator an increase in the specific surface of the sand also leads to a greater specific surface of the dust. For grinding in a ball mill and a vibration mill the specific surface of the dust, beginning with a fineness of sand grinding of 900 sq. cm./g., does not practically increase. This will remain true until the whole batch is crushed to a size of the particles of under 0.1 mm.

The processes of grinding in various machines can be studied with the aid of the functions of grinding. Such functions of grinding for the sands are given in Table 2. Prior art workers used to determine the functions of grinding by considering the changes in the grain composition depending on the duration of grinding. As will be shown below, the sand grains are in the disintegrator for only fractions of a second, and even this duration depends on the number of revolutions of the peg rotors. The greater the number of revolutions of the rotors, the faster the processing of the sand grains in the disintegrator and the finer the grinding. For this reason, grinding in a disintegrator cannot be evaluated by its duration. Taking this into consideration the functions of grinding depending on the value of the specific surface of the sand for all the three machines, namely disintegrator, ball mill and vibration mill have been compiled. In this way, information has been obtained with easily comparable results. As can be seen from Table 2, there exists a linear relationship between the specific surface of the ground material and the duration of grinding when the latter is done in a ball or a vibration mill. The law of linear relationship between the specific surface of the ground material and the amount of electric power consumed per unit of weight of the ground material also holds for comminuting in a disintegrator.

When comminuting sand in the disintegrator, the part of the specific surface related to the fine fractions is smaller than for sand ground in a ball mill or in a vibration mill. A study of the various functions of sand grinding has shown that in a ball mill the large grains are primarily ground and therefore the contents of the large fractions in the ground sand are considerably lower than when grinding sand to an equal specific surface in other installations. A ball mill yields in greater number of fine fractions. A vibration mill primarily grinds small size sand grains. The large grains remain intact even when grinding to a high specific surface.

In a disintegrator as a result of strong impacts of the members, the large structurally weak grains are the first to be crushed. Small size grains have a relatively greater strength and hence even with a greater force and intensification of grinding they are only slightly broken up. As a result of grinding sand in a disintegrator a number of very fine fractions obtained is smaller than when grinding in a ball mill or in a vibration mill.

4.25 cm. in diameter. One hundred grams of sand were poured into the mold. Pressing was carried out twice at a pressure of 625 kg. sq./cm. After the first compression the sand was poured out of the mold, its specific surface was determined once more. The results of the experiments are given in Table 3.

The structural strength of the natural sand from the sand-pit "Quartz" is 71% (Table 3). Comminuting of the sand in a disintegrator raises its structural strength to 84%, while grinding in a ball mill or in a vibration mill reduces it to 63% and 54% respectively. The pressing of sand in a mold raises the structural strength of all the sands. The structural strength of disintegrated sand after compression reaches 93%.

TABLE 3

| Machine in which sand was ground | Specific surface before compression, sq. cm./g. | Specific surface after first compression, sq. cm./g. | Structural strength, percent | Specific surface after second compression, sq. cm./g. | Structural strength of sand pressed once, percent |
|---|---|---|---|---|---|
| Natural sand from the sand-pit "Quartz" | 106 | 149 | 71 | 187 | 80 |
| In a disintegrator | 352 | 420 | 84 | 452 | 93 |
| In a ball mill | 286 | 450 | 63 | 534 | 84 |
| In a vibration mill | 255 | 470 | 54 | 653 | 72 |

Sand grains of an identical chemical and mineralogical composition may have a different structure and contain cracks, depending on the conditions of their formation. Grains with a large number of cracks are easily split under mechanical action. Directly related to the strength of the sand structures is its comminutability of the magnitude of the increase in the specific surface under fixed conditions of grinding.

The structural strength of sand can be determined by the following method:

The grain composition of the sand and its specific surface are determined by sieve analysis of a sand sample, and on the basis of data on specific surface of the separate fractions. Then a part of the sand sample is poured into a metal cylindrical mold and the sand is compressed with the aid of a cylinder piston under the pressure of a hydraulic press. The pressed sand is then extracted from the mold and its grain composition and specific surface are determined.

We have named the percentage ratio of the specific surface of the initial sand to the specific surface obtained after pressing as "the structural strength of sand"

$$\text{Structural strength} = e : \frac{100}{e_1}$$

where $e$ is the specific surface of the sand before pressing and $e_1$ after pressing, in sq. cm./g.

It is recommended that such a batch of sand be put into the mold, which would permit to obtain a height of the column of sand in the mold approximately equal to the diameter of the cylinder with the volumetric weight of the sand being 1.7 g./cm.$^3$. If $d$ is the diameter of the cylinder, in cm., then the amount of sand G placed in it will be, in grams:

$$G = 1.3 d^3$$

The experiments for determining the structural strength of the sand were performed in cylindrical molds For a further test method, equal quantities by weight of sand ground in the various machines are placed in cubic molds 7 x 7 x 7 cu. cm. in size. As the volumetric weight of sand in a compressed and a loose state is different, it is easy to fill cubes of the same volume with equal quantities of sand by weight, but having a different granulometric composition. Thus, the various kinds of sand in the same cubes were of the same volumetric weight. To form a monolith, part of the molds filled with sand were placed in water, and the other part in bitumen heated up to 200° C. They were kept there until all the cavities between the grains were filled up by the water and bitumen. The cubes of sand filled with sand and water were placed in a refrigerator and frozen, while these impregnated with bitumen were cooled in the laboratory premises. The frozen cubes and those with the solidified bitumen were taken out of the molds and tested for compression. The cubes impregnated with bitumen were tested in cool premises and the frozen ones—in a room with a temperature below 0° C. In summer, the frozen cubes after being taken out of the molds were placed in a refrigerator, from which they were taken out immediately before the compression test. The ice and the solidified bitumen in the samples were regarded as a binder between the grains of the various kinds of sand, and it was presumed that under the same temperature conditions the ice and the solidified bitumen in samples of sand of a different quality would possess the same strength. Therefore, the compressive strength of the samples characterizes the quality of the sand as a filler. Table 4 presents the results of the tests of the samples in a frozen state.

It can be seen from the data in Table 4 that all the cube samples made of disintegrated sand had a greater compressive strength than those made of sand ground in a vibration mill. Considering that the strength of such cube samples depends not only on the strength of the sand grains, but also to a great extent on the geometrical shape of the sand grains and on the granulometric com-

TABLE 4

| Sand | Specific surface of sand, sq. cm./g. | Volumetric weight of sand in cubes, g./cu. cm. | Temperature during compressive test, ° C. | Sample Number | Maximum compressive strength, kg./sq. cm. | Average compressive strength, kg./sq. cm. |
|---|---|---|---|---|---|---|
| Disintegrated | 678 | 1.75 | −11 | 1<br>2<br>3 | 151<br>156<br>164 | 157 |
| Ground in vibration mill | 670 | 1.75 | −11 | 1<br>2<br>3 | 123<br>118<br>123 | 121 |
| Natural | 105 | 1.75 | −11 | 1<br>2<br>3 | 91<br>96<br>91 | 93 | position of the sand, it may still be assumed that the greater strength of the disintegrated sand is due to a certain degree to the strength of the grains themselves after grinding.

The results of the following experiments likewise confirm the existence of a better structure in the grains of the disintegrated sand in comparison with the sands ground in a ball mill or a vibration mill.

For the small-sized fractions of sand ground in the various machines the granulometric composition was determined by means of sedimentation analysis directly after grinding and after keeping the sand in water for seven days. While the sand was in the water, the fineness of all the sands increased, the growth in the specific surface of disintegrated sand proving to be smaller as compared with sands ground in a ball mill or a vibration mill. It may be assumed that the decomposition of the sand particles took place under the action of water through the surface faults of the grains. The results of the test are given in Table 5.

TABLE 5

| Grinding machine | Specific surface of sand sq. cm./g. | | Increase in specific surface, percent |
|---|---|---|---|
| | Before keeping in water | After keeping in water | |
| Disintegrator | 208 | 222 | 7 |
| | 567 | 613 | 8 |
| Ball mill | 254 | 342 | 35 |
| | 962 | 1,323 | 38 |
| Vibration mill | 312 | 368 | 18 |
| | 1,052 | 1,392 | 32 |

The frost resistance of sand from the sand-pit of "Quartz" was determined, the sand being placed in tin receptacles in a natural state and ground in a ball mill, a vibration mill and a disintegrator. The sand in the receptacles was saturated with water and subjected to freezing in a refrigerator. After every freezing the samples were thawed out in water at a temperature of 15° C. The changes in the specific surface of the sand were determined after 10, 15 and 20 freezing-thawing cycles. The results of the tests are given in Table 6.

TABLE 6

| Sand | Treatment | | | |
|---|---|---|---|---|
| | Before freezing | After 10 freezing cycles | After 15 freezing cycles | After 20 freezing cycles |
| Natural sand: | | | | |
| Specific surface, sq. cm./g | 73 | 84 | 97 | 106 |
| Structural strength after freezing, $e/e_1 \cdot 100$ (percent) | | 87 | 75 | 69 |
| Ground in a ball mill: | | | | |
| Specific surface, sq. cm./g | 282 | 338 | 377 | 478 |
| Structural strength after freezing, $e/e_1 \cdot 100$ (percent) | | 83 | 75 | 59 |
| Ground in a vibration mill: | | | | |
| Specific surface, sq. cm./g | 267 | 322 | 363 | 454 |
| Structural strength after freezing, $e/e_1 \cdot 100$ (percent) | | 83 | 74 | 49 |
| Ground in a distintegrator: | | | | |
| Specific surface, sq. cm./g | 312 | 312 | 315 | 328 |
| Structural strength after freezing, $e/e_1 \cdot 100$ (percent) | | 100 | 99 | 98 |

There are a number of considerations regarding the crushing of material. In crushing, new surfaces take place as a result of stresses set up in the material which exceed the maximum elastic deformations.

It is known that solid bodies have weak areas in their crystal lattice, as well as fissures. It is natural that the material is destroyed first of all in these weak areas. The condition of a solid body during crushing depends above all on its "real structure." The "real structure" implies all the typical properties of the fine structure of a solid body. The basis of a fine structure is the lattice of an ideal crystal, for example, atoms of Si and O alternately in $SiO_2$.

The crystal surfaces of all solid bodies longer than 1 micron are composed of so-called "mosaic blocks" which are crystallographically located irregularly in respect to each other, and their size may reach a micron. The space between the blocks is filled up with a glass-like structure, its regularity being less distinct as compared with a crystal structure. The bonds between the ions and atoms of this structure differ and they are less strong than the bonds in an ideal crystal.

Sands of various genesis have a "bond spectrum" of varying kinds. It is clear that the structure of the sand has a noticeable influence on its grindability. But with a reduction in the size of the particles of the material the number of defective areas gradually drops. This leads to strengthening of the small particles of the material. Strengthening of the material begins after the particles reach a size of 1 to 2 mm. Consequently, this size is the natural boundary between crushing and grinding. Sufficiently small particles attain the maximum strength upon which there are already no faults. It has been established by investigations that this boundary sets in when the size of the particles is about 0.1 micron.

The highest efficiency of crushing and grinding is attained in high-frequency mechanical action, i.e. periodically arising stressed conditions. The weak spots in the structure of material being deformed possess a capacity for self-restoration and for joining together under the action of the molecular forces of adhesion. This joining can be avoided by using high-frequency action.

With high frequencies all solid materials are destroyed like fragible bodies, requiring a minimum of power for the destruction. As the frequency of vibration increases, the number of fissures which have time to restore themselves diminishes, thus leading to the destruction of the body in a shorter period and with a smaller consumption of power.

The same kinds of sand ground in various machines have a different structural strength. In the process of grinding, there takes place not only splitting of the grains along the existing faults in the real structure of the material, but simultaneously new faults are also created under the action of mechanical forces. If the acting mechanical forces are weak and the individual impulses are insignificant then new fissures are formed on the surface layer of the sand being ground and small particles of the material are split off. The existing faults inside the grains also continue to develop. First of all, the fissures of the real structure of the crystal become deeper. The internal faults may develop until the grain cracks along the weakest plane, depending on the magnitude of the force and the number of times it is applied. If the intensity of the forces proved to be insufficient to crush the grains, the structure of the grains may even become worse during grinding and the structural strength of the sand may decrease. Since sand is ground in a vibration mill by means of weak impacts and by abrasion, its structural strength becomes worse.

In a ball mill the material receives a small number of impacts of a medium force. In this case abrasion of the material between the balls is of great importance, which also leads to an increase in the surface faults.

In disintegrators of the present invention the grain of sand strikes the hard surface of a steel member at a velocity of at least 15 m./sec. and preferably 50 to 200 m./sec., receiving a strong sharp impact. Such impacts follow each other in up to 0.05 second and preferably in 0.001 second, as a result of which the sand grains are crushed, chiefly along the inner faults of the grain, and the ground sand acquires a greater structural strength than natural sand.

It is therefore quite natural that grinding in a disintegrator of the present invention increases the structural strength of sand, while grinding in a ball mill or in a vibration mill reduces it.

The question arises as to whether the above difference in the strength of samples of sand ground in various machines is due only to the different geometrical shape of the grains, to the granulometric composition and the different structural strength, or whether the sand grains acquire still other properties affecting the strength of the products. To clear up this question an experiment was performed involving the freezing of the samples, and there was also determined the strength of steamed samples prepared under identical conditions of lime and sand having various size grains, with a content of active CaO 10% and with steaming for three hours under a stream pressure amounting to atm. gauge. The results of the tests of these samples are given in Table 7.

TABLE 7

| Grinding machine | Disintegrator | Ball mill | Vibration mill |
| --- | --- | --- | --- |
| Specific surface of sand sq.cm./g | 500 | 500 | 500 |
| Frozen cubes: | | | |
| Volumetric weight of dry substance g./cu. cm | 1.8 | 1.8 | 1.8 |
| Compressive strength kg./sq. cm | 259 | 226 | 192 |
| Relative compressive strength, percent | 100 | 87 | 74 |
| Volumetric weight, g./cu. cm | 1.9 | 1.9 | 1.9 |
| Steamed cubes: | | | |
| Compressive strength kg./sq. cm | 741 | 537 | 479 |
| Relative compressive strength | 100 | 72 | 65 |
| Ratio of compressive strength of steamed and frozen cubes: | | | |
| Absolute strength | 2.86 | 2.38 | 2.50 |
| Relative strength | 1.00 | 0.83 | 0.88 |

The compressive strength of the frozen and steamed samples is considerably greater for samples made of sand ground in a disintegrator.

Sand is the basic material in the manufacture of lime-sand products. The contents of sand in these products exceed those of lime by from 8 to 10 times. Therefore improvements in the technology of lime-sand products should be aimed, above all at improving the properties of the sand.

Upon mechanical deformation of a solid, part of the work is absorbed by the substance being deformed, similarly during the grinding of sand there also takes place besides the crushing, a process of absorbing a part of the mechanical energy in the material being ground. The amount of energy absorbed depends on the kind of deformation of the solid body, which has taken place. Upon compression the absorption of energy is considerably higher than in elongation or bending. It is also known that the change in the crystal lattice of a substance and the amount of energy accumulated is greater for dynamic deformation than for static one.

The amount of energy accumulated grows in proportion to the increase in the rate of deformation.

The absorption of energy causes changes in the substance being deformed and is accompanied by the formation of a new surface, the appearance of microscopic fissures and faults in the crystal lattice. The chemical activity of the substance, its solubility and diffusion properties increase. The chemical activity of the sand, its solubility and diffusion properties play an important part in the formation of the qualitative structure of sand-lime products. The accumulation of energy connected with the formation of a faulty lattice is especially great upon deformation of the material by compression. Therefore, preference should be given to such grinding machines that cause the greatest deformation of the material being ground by compression.

The relationship between the strength and the capacity of the material for deformation on one hand and the rate of deformation on the other has been studied adequately enough in the field of metals. During a momentary impact the material withstands considerably greater loads than during a continuous one, and large local permanent deformations are formed. A physical explanation is the following:

In a sand-lime monolith the sand grain is simultaneously a filler and a component of the binder, which combines during steaming with the lime and the other sand grains into a strong monolith. As a binder the sand grain should possess the most active surface layer, and the greatest strength as a filler.

In this connection a machine for preparing lime-sand mixtures should reduce the number of faults in the sand grain structure and increase the strength of the grains by crushing them along the weakest mosaic surfaces. This can be achieved by subjecting the grains of sand to separate strong and frequent impacts.

Sand grains in a disintegrator, striking the bars members with a great velocity receive powerful impacts. As a result they are crushed along the weak planes of the structure. Considerable local stresses appear at the points of contact, which activate the sand grains in the surface layer. Deformation of the sand grains at velocities of 100 m./sec. may spread to a depth of over 10 micron or to 5% of the grain diameter. The size of the area of the deformed surface caused by one impact amounts to about 5–10% of the initial surface. In a disintegrator, where each grain of sand receives at least three impacts, the surfaces of even strong and faultless sand grains, not crushed by the impacts are activated.

A better understanding of the significance of the existance of a deep layer of activated sand on the surface of the grains treated to the disintegrator could be derived measurements of the properties that are changed by the activation.

In Table 8 are reported the specific weights of sand ground to a different specific surface by the disintegrator, a vibration mill and a ball mil. It can be immediately seen that for all the values of the specific surface considered the maximum decrease in the specific weight is shown by the sand processed in the disintegrator; such a decrease is an indication of the existence of an activated surface layer deeper than the limited activated layer formed on the surface of ground sand using ball mills or vibration mills.

Similar results can be obtained measuring other properties of the sand.

When sand and slaked lime are jointly passed through a disintegrator, they are also ideally mixed. The air currents and vortexes formed in the disintegrator carry a thin fine lime dust in a suspended state until it adheres compactly to the surface of the sand grains. The lime is thus initially connected with their freshly formed active surface.

When grinding sand and processing lime-sand products in a disintegrator the all sand grains are under special conditions as compared with those in a ball mill or in a vibration mill. This leads not only a change in the mechanical and geometrical properties of the sand grains, but also to their higher activity and intimate mixing.

The relatively weak impacts received by the sand grains when ground in a vibration mill are incapable of crushing the large grains of sand. Intensive grinding begins when the grains are of a certain minimum size. Weak impacts in the large grains of sand deepen the fissures in their structure and reduce their structure strength.

In a ball mill, where the diameter of the sand grains is infinitely small in comparison with that of the balls, the sand during grinding occupies mainly the space between the balls. The larger grains are subjected to intensive impacts, and during prolonged grinding the granulometric composition becomes uniform. Here the force of the impacts is likewise small and for this reason there is an increase in the faults in the sand grains and a reduction in their structural strength.

It will be apparent that many changes and modifications of the several described herein may be made without departing from the spirit and scope of the invention. It is therefore apparent that the foregoing description is by way of illustration of the invention rather than limitation of the invention.

TABLE 8

| Specific surface, sq. cm./g. | Specific weight of sand, g./cu. cm. | | | |
|---|---|---|---|---|
| | Natural sand | Sand treated in a vibration mill | Sand treated in a ball mill | Sand treated in a disintegrator |
| 20 | 2.6510 | | | |
| 1,000 | | 2.6496 | 2.6495 | 2.6487 |
| 1,500 | | 2.6471 | 2.6486 | 2.6460 |

What is claimed is:

1. A modular constructional unit manufactured by autoclave curing a mixture, of a composition consisting essentially of sand from about 65% to 86% by weight of the dry mixture, lime from about 14% to 35% by weight of the dry mixture, said lime being in the form of a powder, the particles of sand being larger than the powder and from 0.2 micron up to 2 inches in a major dimension, and water from about 8% to 43% by weight of the dry mixture, the total mixture being produced by introducing both lime and sand into the center of an impact zone, simultaneously introducing water into said impact zone, hurling said particles of sand at a velocity of at least 15 meters per second, successively impacting said hurling particles at least three times whereby their course of travel is changed and said successive impacts are carried out within 0.05 second of each other, at the same time substantially coating said sand particles with particles of lime and thereafter removing said particulate material from said impact zone, said manufactured modular constructional unit having a compressive strength of from about 200 to 3250 kg./cm.$^2$.

2. A modular constructional unit as claimed in claim 1, which has a density of from about 0.9 to 2.0 kg./dm.$^3$.

3. A modular constructional unit as claimed in claim 1 in which said mixture further comprises a foaming agent selected from the group consisting essentially of aluminum powder, and a mixture of 60% carpenter's glue and 40% colophony soap.

4. A modular construction unit as claimed in claim 3 in which said foaming agent is present in an amount of from 0.015 to 0.2% by weight of the dry mixture.

5. A modular structural unit as claimed in claim 1, which has a density of from about 1.6 to 2 kg./dm.$^3$ and a compressive strength of from about 350 to 3250 kg./cm.$^2$.

6. A modular structural unit as claimed in claim 1, which has a density of from about 1.8 to 2 kg./dm.$^3$ and a compressible strength of from about 700 to 3250 kg./cm.$^2$.

7. A modular structural unit as claimed in claim 1, which has a density of from about 1.8 to 2.0 kg./dm.$^3$ and a compressive strength of from about 2000 to 3250 kg./cm.$^2$.

8. A modular structural unit as claimed in claim 3, which has a density of from about 0.9 to 1.2 kg./dm.$^3$ and a compressive strength of from about 200 to 500 kg./cm.$^2$.

References Cited
UNITED STATES PATENTS

| | | | |
|---|---|---|---|
| 3,062,669 | 12/1962 | Dilnot | 106—87 |
| 2,898,220 | 8/1959 | Ulfstedt et al. | 106—87 |
| 2,803,556 | 8/1957 | Carlsson et al. | 106—87 |
| 2,754,547 | 7/1956 | Allen | 106—120 |
| 2,699,097 | 1/1955 | Binkley | 106—120 |
| 2,698,252 | 12/1954 | Havelin | 106—120 |
| 2,326,516 | 8/1943 | Brown | 106—120 |
| 2,119,860 | 6/1938 | Henderson | 106—87 |
| 2,081,802 | 5/1937 | Eklund | 106—87 |
| 3,226,242 | 12/1965 | Huettemann | 106—120 |
| 2,540,354 | 2/1951 | Selden | 106—120 |
| 1,569,755 | 1/1926 | Iwin | 106—120 |

JAMES E. POER, Primary Examiner

W. T. SCOTT, Assistant Examiner

U.S. Cl. X.R.

106—85, 90, 97, 120